April 10, 1973　　　　　A. L. BORROR　　　　　3,726,675
FILM UNITS COMPRISING LIGHT REFLECTING MATERIALS AND
9- 2-(N-ALKYL)-PYRIDYL -FLUORENE OPTICAL FILTER
AGENTS AND PROCESSES FOR THEIR USE
Original Filed June 25, 1970　　　　　　　　　8 Sheets-Sheet 1

INVENTOR.
ALAN L. BORROR

BY Brown and Mikulka
and
Robert M Ford
ATTORNEYS

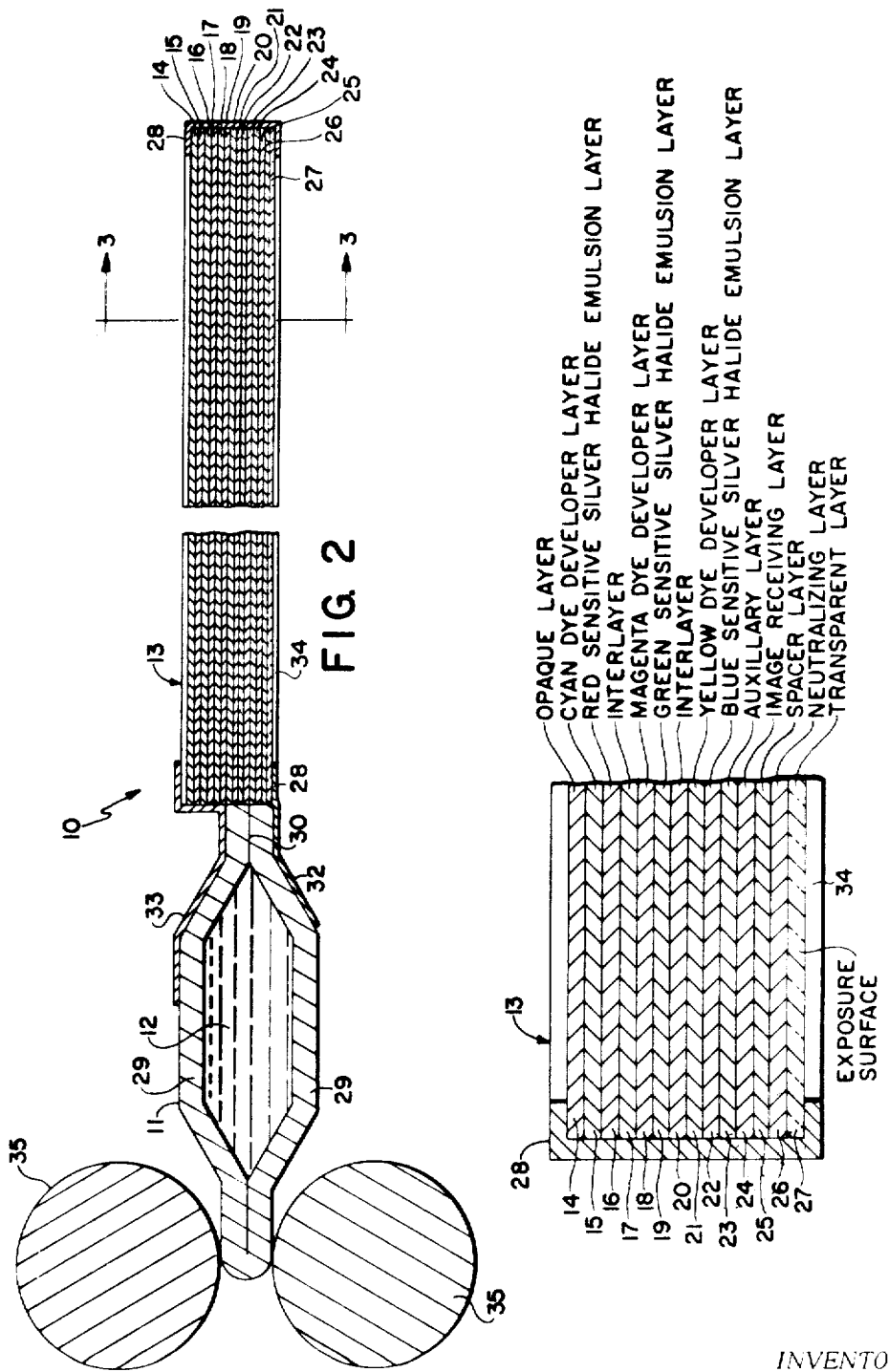

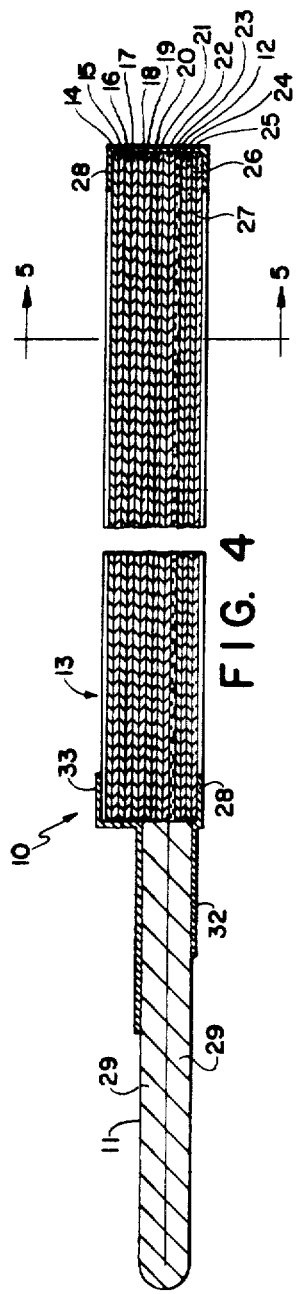
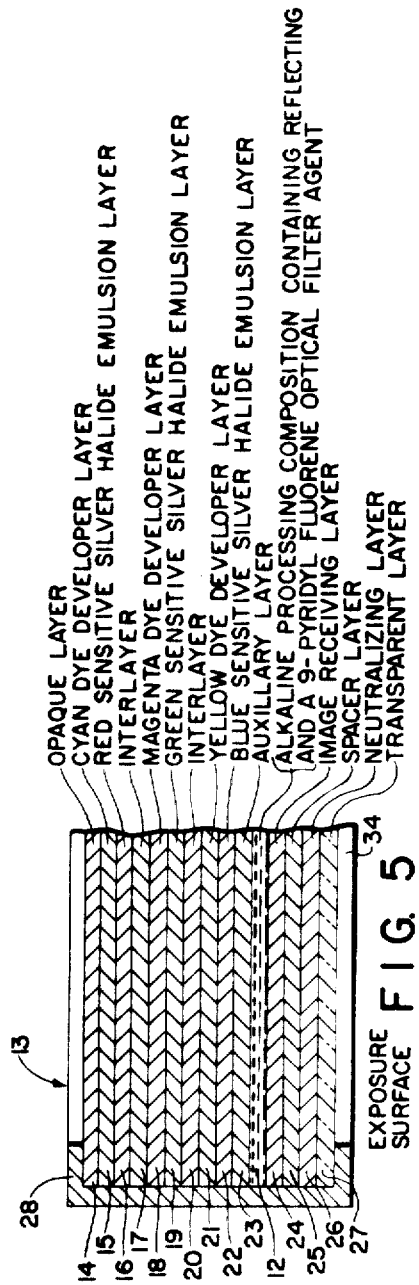
FIG. 4
FIG. 5
INVENTOR.
ALAN L. BORROR

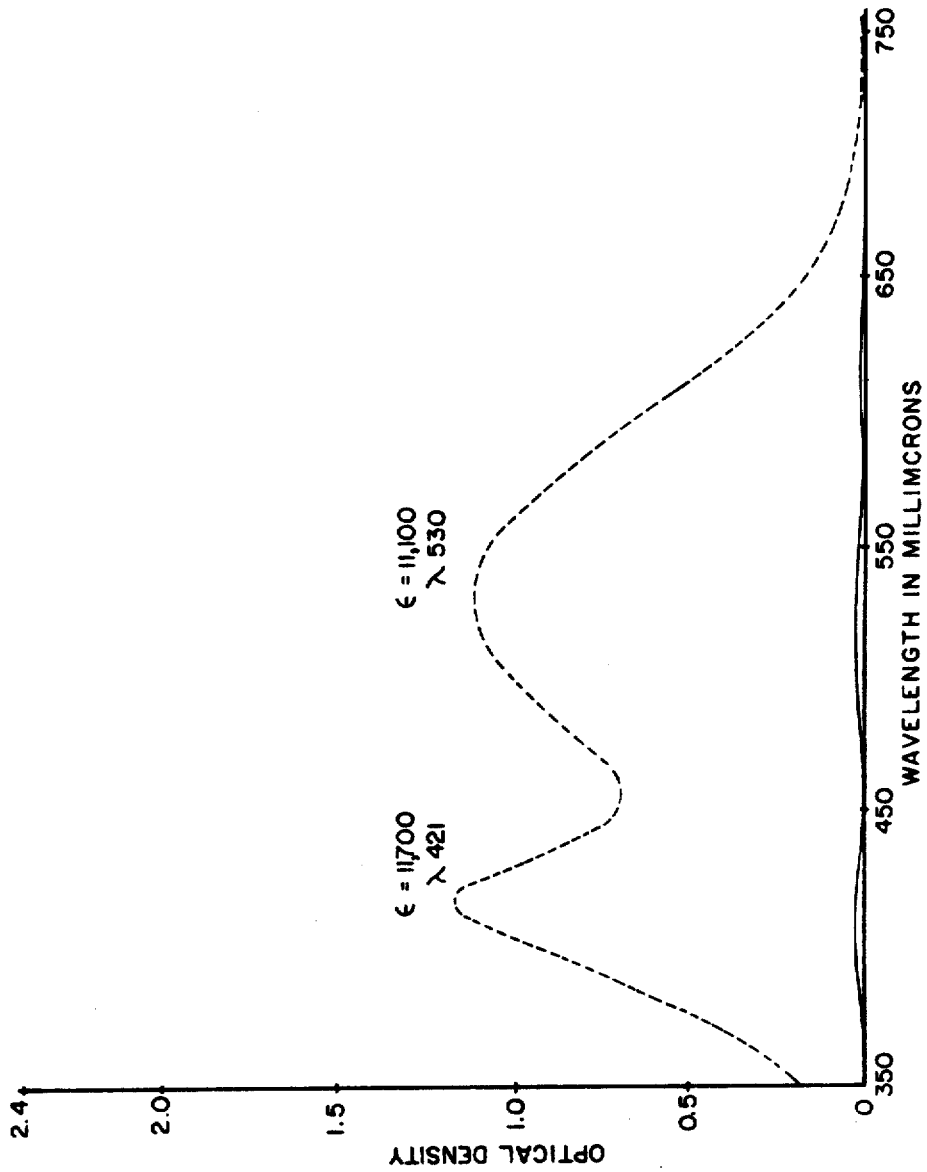

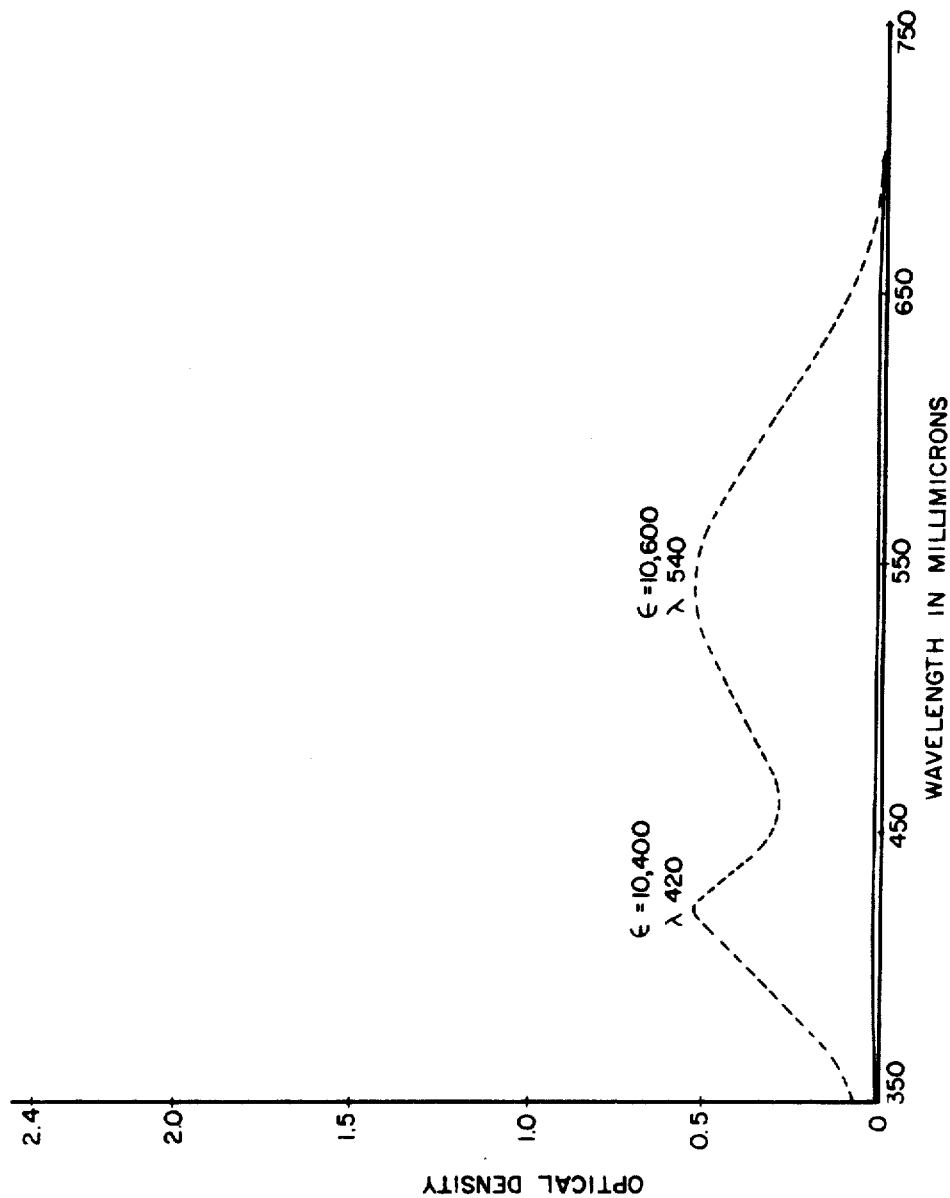

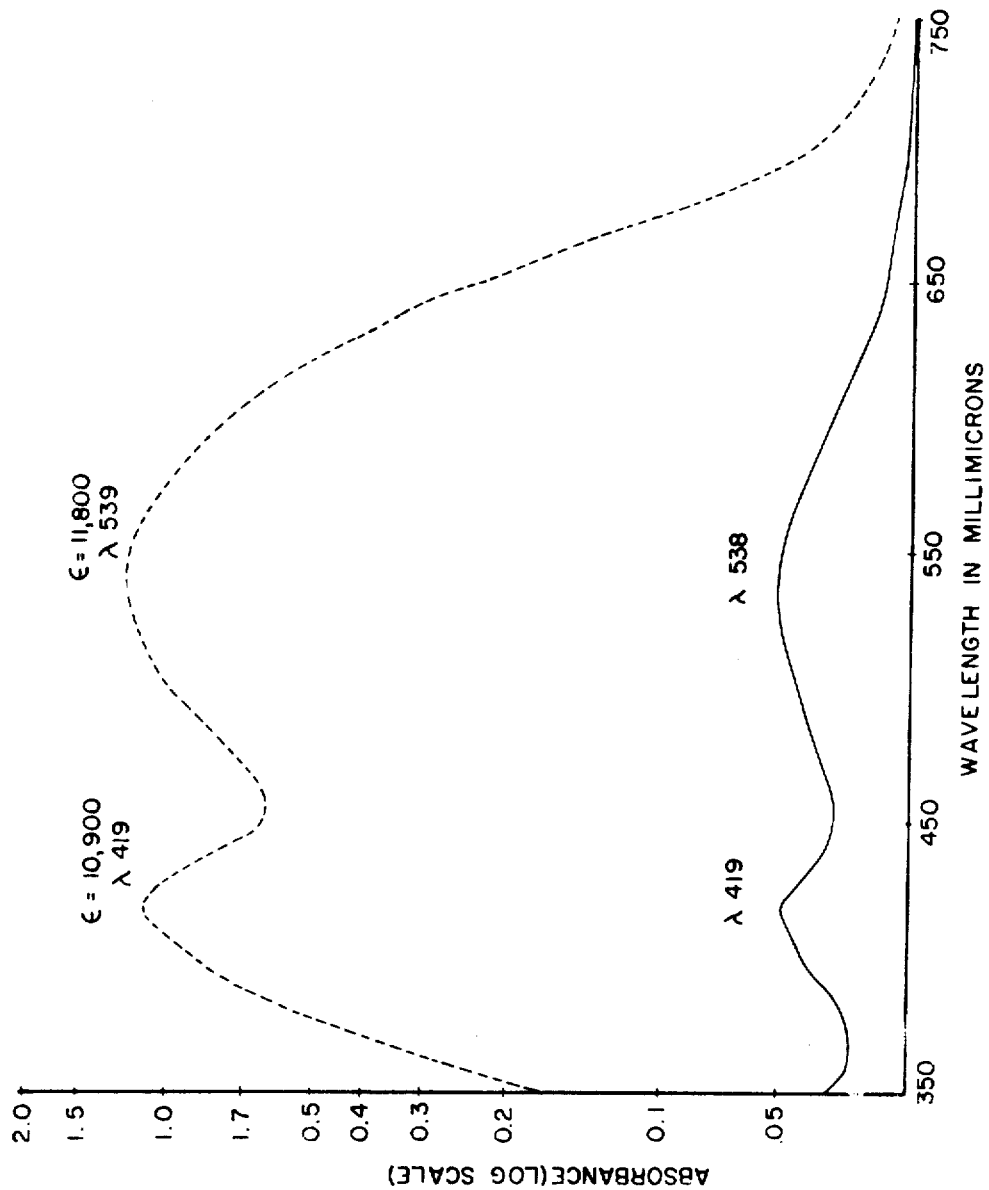

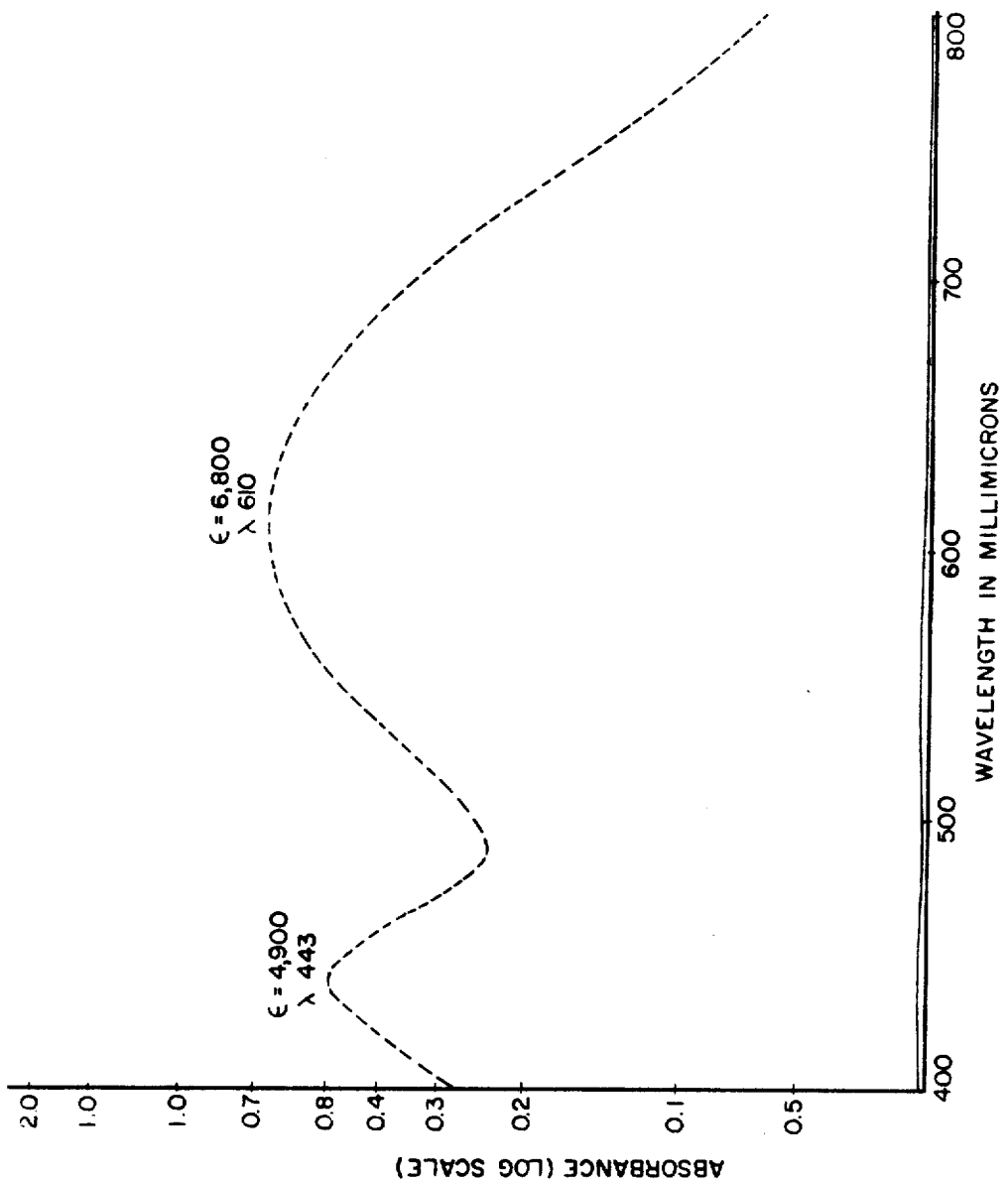

United States Patent Office 3,726,675
Patented Apr. 10, 1973

---

3,726,675
FILM UNITS COMPRISING LIGHT REFLECTING MATERIALS AND 9 - [2-(N-ALKYL)-PYRIDYL]-FLUORENE OPTICAL FILTER AGENTS AND PROCESSES FOR THEIR USE
Alan L. Borror, Arlington, Mass., assignor to Polaroid Corporation, Cambridge, Mass.
Continuation of application Ser. No. 49,627, June 25, 1970. This application Sept. 28, 1971, Ser. No. 184,363
Int. Cl. G03c *1/84, 5/54, 7/00*
U.S. Cl. 96—3           36 Claims

ABSTRACT OF THE DISCLOSURE

The present invention relates to photography and, more particularly, to photographic film units which comprise photosensitive silver halide having associated therewith 9-pyridyl fluorene, and to photographic processes, more particularly, photographic diffusion transfer processes, adapted to employ such film units.

---

Figure 1:
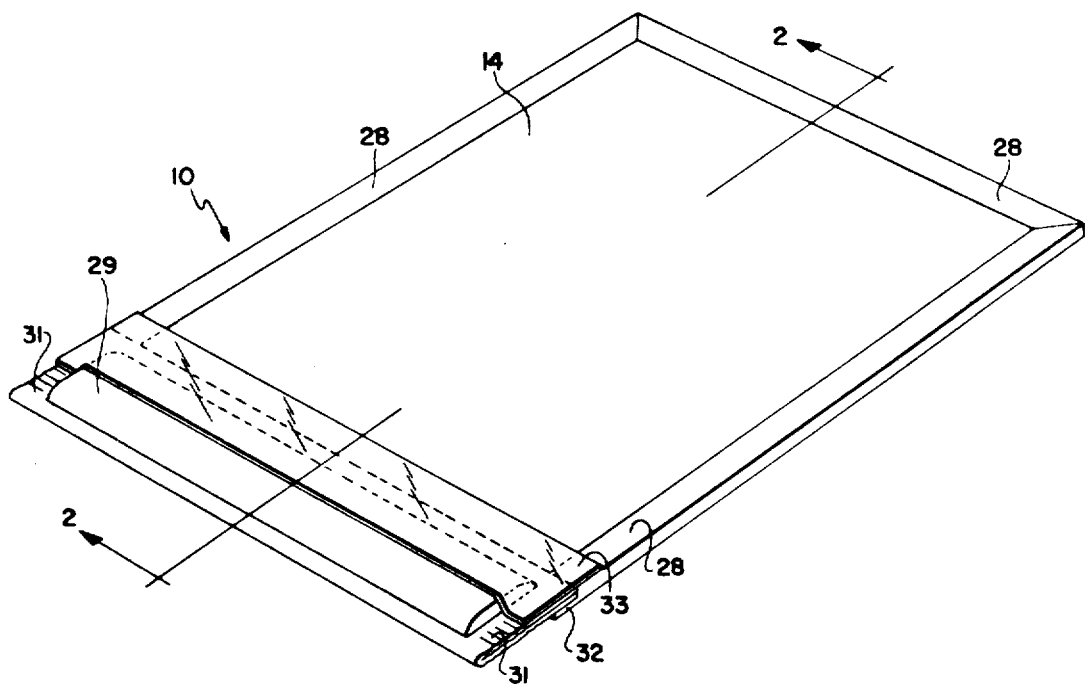

This application is a continuation of my copending application Ser. No. 49,627, filed June 25, 1970 and now abandoned.

The present invention relates to photography and, more particularly, to photographic products particularly adapted for employment in photographic diffusion transfer color processes.

The primary objects of the present invention are to provide novel photographic products which comprise photosensitive silver halide having associated therewith an optical or spectral filter agent of the class defined hereinafter; to provide novel photographic products of the last-identified type particularly adapted for employment in diffusion transfer photographic processes; to provide novel photographic products of the last-identified type particularly adapted for employment in color diffusion transfer processes which comprise a photosensitive composite structure which contains a plurality of layers including a first dimensionally stable, liquid impermeable layer, a photosensitive silver halide emulsion layer having a dye image-forming material associated therewith which is soluble and diffusible in processing composition as a function of the point-to-point degree of exposure of its associated emulsion and an optical filter agent of the class denoted hereinafter which is adapted to selectively absorb electromagnetic radiation incident thereon, a polymeric layer dyeable by the dye image-forming material, and preferably a second dimensionally stable, liquid impermeable layer, transparent to incident radiation, in combination, in the preferred embodiments, with a rupturable container retaining a processing composition, fixedly positioned and extending transverse a leading edge of the composite photosensitive structure to effect, upon application of compressive pressure, discharge of the processing composition, in particularly preferred embodiments, intermediate the dyeable polymeric layer and photosensitive silver halide emulsion next adjacent thereto, and including a reflecting agent disposed intermediate the dyeable polymeric layer and the photosensitive emulsion next adjacent thereto in a quantity sufficient to mask the dye image-forming material; to provide a diffusion transfer color film unit of the last-identified type possessing the reflecting agent initially present in the processing composition for discharge intermediate the dyeable polymeric layer and the photosensitive silver halide emulsion next adjacent thereto upon application of compressive pressure to the container and distribution of its contents intermediate the layers; and to provide photographic processes particularly diffusion transfer color processes employing such products.

Other objects of the invention will in part be obvious and will in part appear hereinafter.

The invention accordingly comprises the product possessing the features, properties and the relation of components and the process involving the several steps and the relation and order of one or more of such steps with respect to each of the others which are exemplified in the following detailed disclosure, and the scope of the application of which will be indicated in the claims.

Figure 6:
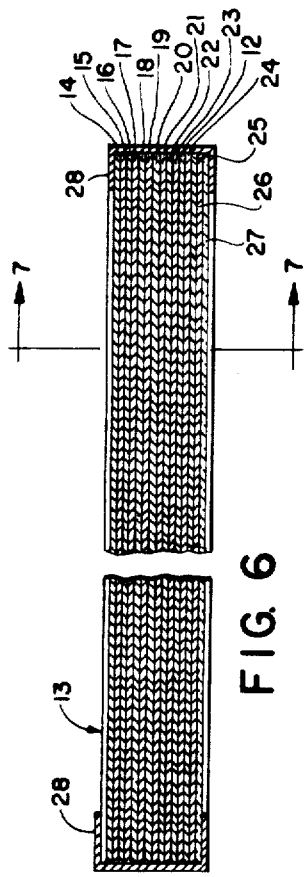
Figure 7:
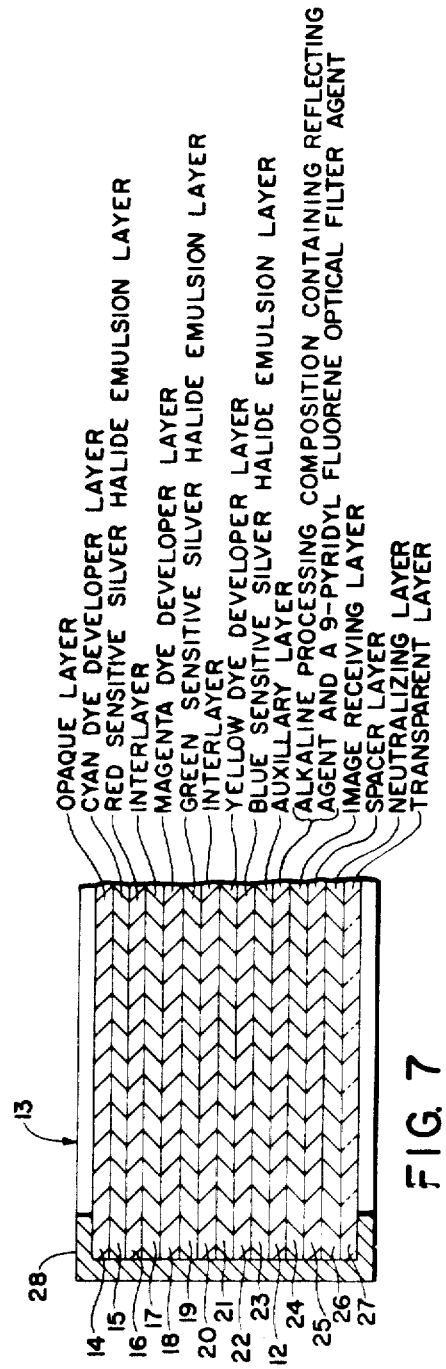

For a fuller understanding of the nature and objects of the invention, reference should be had to the following detailed description taken in connection with the accompanying drawings wherein:

FIG. 1 is a perspective view of a photographic film unit embodying the invention;

FIGS. 2, 4 and 6 are diagrammatic enlarged cross-sectional views of the film unit of FIG. 1, along section line 2—2, illustrating the association of elements during the three illustrated states of the performance of a diffusion transfer process, for the production of a multicolor transfer image according to the invention, the thickness of the various materials being exaggerated, and wherein FIG. 2 represents an exposure stage, FIG. 4 represents a processing stage and FIG. 6 represents a product of the process;

FIGS. 3, 5 and 7 are diagrammatic, further enlarged cross-sectional views of the film unit of FIGS. 2, 4 and 6, along section lines 3—3, 5—5 and 7—7, respectively, further illustrating, in detail, the arrangement of layers comprising the photosensitive laminate during the three illustrated stages of the transfer process; and FIGS. 8, 9, 10, and 11 are graphic illustrations of the spectral absorption characteristics of the optical filter agents of the present invention set forth hereinafter as Formulae C, D, E, and F, respectively, including the absorption curve of the respective agents at a pH substantially below their pKa denoted as a solid line and the absorption curve of the agents at a pH substantially above their pKa denoted as a broken line.

As disclosed in U.S. Pat. No. 2,983,606, issued May 9, 1961, a photosensitive element containing a dye developer, that is, a dye which is a silver halide developing agent, and a silver halide emulsion may be exposed and wetted by a liquid processing composition, for example, by immersion, coating, spraying, flowing, etc., in the dark, and the exposed photosensitive element superposed prior to, during, or after wetting, on a sheetlike support element which may be utilized as an image-receiving element. In a preferred embodiment, the liquid processing composition is applied to the photosensitive element in a substantially uniform layer as the photosensitive element is brought into superposed relationship with the image-receiving layer. The liquid processing composition, positioned intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving element receives a depthwise diffusion, from the developed emulsion, of unoxidized dye developer without appreciably disturbing the imagewise distribution thereof to provide the reversed or positive color image of the developed image. The image-receiving element may contain agents adapted to mordant or otherwise fix the diffused, unoxidized dye developer. The desired positive image is revealed by stripping the image-receiving layer from the photosensitive element at the end of a suitable imbibition period.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Multicolor images may be obtained using color image-forming components such as, for example, the previously mentioned dye developers, in diffusion transfer processes by several techniques. One such technique contemplates obtaining multicolor transfer images utilizing dye developers by employment of an integral multilayer photosensitive element, such as is disclosed in the aforementioned U.S. Pat. No. 2,983,606, and particularly with reference to FIG. 9 of the patent's drawing, wherein at least two selectively sensitized photosensitive strata, superposed on a single support, are processed, simultaneously and without separation, with a single, common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata are disclosed to be optionally separated from other sets by suitable interlayers, for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

The dye developers are preferably selected for their ability to provide colors that are useful in carrying out subtractive color photography, this is, the previously mentioned cyan, magenta and yellow. The dye developers employed may be incorporated in the respective silver halide emulsion or, in the preferred embodiment, in a separate layer behind the respective silver halide emulsion. Specifically, the dye developer may, for example, be in a coating or layer behind the respective silver halide emulsion and such a layer of dye developer may be applied by use of a coating solution containing about 0.5 to 8%, by weight, of the respective dye developer distributed in a film-forming natural, or synthetic, polymer, for example, gelatin, polyvinyl alcohol, and the like, adapted to be permeated by the chosen diffusion transfer fluid processing composition.

As examples of materials, for use as the image-receiving layer, mention may be made of solution dyeable polymers such as nylon as, for example, N-methoxymethyl polyhexamethylene adipamide; partially hydrolyzed polyvinyl acetate; polyvinyl alcohol with or without plasticizers; cellulose acetate with filler as, for example, one-half cellulose acetate and one-half oleic acid; gelatin; and other materials of a similar nature. Preferred materials comprise polyvinyl alcohol or gelatin containing a dye mordant such as poly-4-vinylpyridine, as disclosed in U.S. Pat. No. 3,148,061, issued Sept. 8, 1964.

As disclosed in the previously cited patents, the liquid processing composition referred to for efficient multicolor diffusion transfer processes comprises an aqueous solution of an alkaline material, for example, diethylamide, sodium hydroxide or sodium carbonate and the like, and preferably possessing a pH in excess of 12, and most preferably includes a viscosity-increasing compound constituting a film-forming material of the type which, when the composition is spread and dried, forms a relatively firm and relatively stable film. The film-forming materials disclosed comprise high molecular weight polymers such as polymeric, water-soluble ethers which are inert to an alkaline solution such as, for example, a hydroxyethyl cellulose or sodium carboxymethyl cellulose. Additionally, film-forming materials or thickening agents whose ability to increase viscosity is substantially unaffected if left in solution for a long period of time are also disclosed to be capable of utilization. As stated, the film-forming material is preferably contained in the processing composition in such suitable quantities as to impart to the composition a viscosity in excess of 100 cps. at a temperature of approximately 24° C. and preferably in the order of 100,000 cps. to 200,000 cps. at that temperature.

In accordance with aforementioned U.S. Pat. No. 2,983,606, an image-receiving layer of the type disclosed in that patent need not be separated from its superposed contact with the photosensitive element, subsequent to transfer image formation, if the image-receiving element is transparent and a processing composition containing a substance rendering the processing composition layer opaque is spread between the image-receiving layer and the silver halide emulsion or emulsions.

However, it has been found, if the image-receiving element is maintained in contact with the photosensitive element, subsequent to dye developer transfer image formation, and includes the presence of an alkaline processing composition, necessarily having a pH at which dye developer, for example, in reduced form, diffuses to form the dye transfer image, intermediate the elements, the transfer image thus formed is unstable over an extended period of time. The dye image instability is due, at least in part to the presence of what is, in general, a relatively high pH alkaline composition in intimate contact with the dye or dyes forming the image. This contact itself provides instability to the molecular structure of dye by, for example, catalyzing degradation and undesirable structural shifts effecting the spectral absorption characteristics of the image dye. In addition, the presence of an alkaline composition, possessing a pH at which the dye, for example, in reduced form, diffuses, also provides an integral dynamic system wherein oxidized dye, immobilized in areas of the photosensitive element, as a function of its development, with the passage of time attempts to generate in such an equilibrium between oxidized and reduced dye. In that the pH of the dynamic system is such that diffusion of the reduced form of the dye will occur, such reduced dye will, at least in part, transfer to the image-receiving layer and the resultant diffusion will imbalance the equilibrium, in such areas of the photosensitive element, in favor of additional formation of reduced dye. As a function of the efficiency of the image-receiving layer, as a dye sink, such nonimagewise dyeing of the image-carrying layer still further imbalances the equilibrium in favor of the additional formation of dye in reduced, diffusible form. Under such circumstances, the transfer image definition, originally carried by the image-receiving layer, may suffer a continuous decrease in the delta between the image's maximum and minimum densities and may, ultimately, result in the image-receiving element's loss of all semblance of image definition; merely becoming a polymeric stratum carrying a relatively uniform overall dyeing.

Any attempt to decrease the dye sink capacity of the image-carrying layer, for example, by reduction of its mordant capacity, in order to alleviate, at least to an extent, the action of the image-receiving layer as a dye sink, however, will enhance diffusion of the dye, comprising the transfer image, from the image-carrying layer, to the remainder of the element due, at least in part, to the continued presence of the alkaline composition having a pH at which the reduced form of the dye, forming the transfer image, is diffusible. The ultimate result is substantially the same overall image distortion as occurs when the image-receiving layer acts as a dye sink, with the exception that the dye is more extensively distributed throughout the film unit and the ultimate overall dyeing of the image-receiving layer itself is of lower saturation.

The problems inherent in fabricating a film unit of the type wherein the image-receiving element, the alkaline processing composition and the photosensitive element are maintained in contiguous contact subsequent to dye transfer image formation, for example, a film unit of the type described hereinbefore with reference to aforementioned U.S. Pat. No. 2,983,606, may be effectively obviated by fabrication of a film unit in accordance with the physical parameters specifically set forth in copending U.S. Pats. Nos. 3,415,644; 3,415,645; and 3,415,646, issued Dec. 10, 1969, respectively, in the name of Edwin H. Land.

Specifically an integral photographic film unit particularly adapted for the production of a dye transfer image of unexpectedly improved stability and other properties, by a color diffusion transfer process may be constructed, for example, in accordance with aforementioned U.S. Pat. No. 3,415,644, to include a photosensitive element comprising a laminate having, in sequence, as essential layers: a dimensionally stable opaque layer; a photosensitive silver halide emulsion layer having associated therewith dye image-providing material which is soluble and diffusible, in alkali, at a first pH; an alkaline solution permeable polymer layer dyeable by the dye image-providing material; a polymeric acid layer containing sufficient acidifying material to effect reduction, subsequent to substantial transfer dye image formation, of a selected processing solution having the first pH to a second pH at which said dye image-providing material is insoluble and nondiffusible; and a dimensionally stable transparent layer. In combination with the laminate, rupturable container retaining an aqueous alkaline processing composition having the first pH and containing an opacifying agent, in a quantity sufficient to mask the dye image-providing material, is fixedly positioned and extends transverse a leading edge of the laminate whereby to effect unidirectional discharge of the container's contents between the alkaline solution permeable and dyeable polymeric layer and the photosensitive silver halide emulsion layer next adjacent thereto, upon application of compressive force to the container.

It will also be recognized that the dimensionally stable polymeric support layer next adjacent the photosensitive silver halide emulsion layer or layers may be transparent, as disclosed in aforementioned U.S. Pat. No. 2,415,646, and that in such instance the opacifying agent may be initially dispersed in the composite film unit intermediate the dyeable polymeric layer and the silver halide emulsion layer next adjacent, as disclosed in aforementioned U.S. Pat. No. 3,415,645.

Employment of the last-mentioned film units, according to the described color diffusion transfer photographic process, specifically provides for the production of a highly stable color transfer image accomplished, at least in part, by effectively obviating the previously discussed disadvantages of the prior art products and processes, by in process adjustment of the environmental pH of the film unit from a pH at which transfer processing is operative to a pH at which dye transfer is inoperative subsequent to substantial transfer image formation. The stable color transfer image is obtained irrespective of the fact that the film unit is maintained as an integral laminate unit during exposure, processing, viewing, and storage of the unit, which transfer image exhibits the required maximum and minimum dye transfer image densities, dye saturation, hues and definition.

However, film units fabricated in accordance with the parameters set forth above specifically require the presence of the stated polymeric acid component to effect in situ process adjustment of the film units' operational pH range.

Specifically, the film units require the presence of a polymeric auid layer such as, for example, of the type set forth in U.S. Pat. No. 3,362,819 which, most preferably, includes the presence of an inert timing or spacer layer intermediate the polymeric acid layer carried on a support and the image-receiving layer.

As set forth in the last-mentioned patent, the polymeric acid layer comprises polymers which may contain acid groups, such as carboxylic acid and sulfonic acid groups, which are capable of forming salts with alkali metals, such as sodium, potassium etc., or with organic bases, particularly quaternary ammonium base, such as tetramethyl ammonium hydroxide, or potentially acid-yielding groups, such as anhydrides or lactones, or other groups which are capable of reacting with bases to capture and retain them. The acid-reacting material is, of course, nondiffusible from the acid polymer layer. In the preferred embodiments disclosed, the acid polymer contains free carboxyl groups and the transfer processing composition employed contains a large concentration of sodium and/or potassium ions. The acid polymers stated to be most useful are characterized by containing free carboxyl groups, being insoluble in water in the free acid form, and by forming water-soluble sodium and/or potassium salts. One may also employ polymers containing carboxylic acid anhydride groups, at least some of which preferably have been converted to free carboxyl groups prior to imbibition. While the most readily available polymeric acids are derivatives of cellulose or of vinyl polymers, polymeric acids from other classes of polymers may be used. As examples of specific polymeric acids set forth in the application, mentioned may be made of dibasic acid half-ester derivatives of cellulose which derivatives contain free carboxyl groups, e.g., cellulose acetate hydrogen phthalate, cellulose acetate hydrogen glutrate, cellulose acetate hydrogen succinate, ethyl cellulose hydrogen succinate, ethyl cellulose acetate hydrogen succinate, cellulose acetate hydrogen succinate hydrogen phthalate; ether and ester derivatives or cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid; partial esters of ethylene/maleic anhydride copolymers; partial esters of methyl-vinyl ether/maleic anhydride copolymers; etc.

As previously noted, the pH of the processing, composition preferably is of the order of at least 12 to 14. The acid polymer layer is disclosed to contain at least sufficient acid groups to effect a reduction in the pH of the image layer from a pH of about 12 to 14 to a pH of at least 11 or lower at the end of the imbibition period, and preferably to a pH of about 5 to 8 within a short time after imbibition, thus requiring, of course, that the action of the polymeric acid layer be accurately so controlled as not to interefere with either development of the negative or image transfer of unoxidized dye developers. For this reason, the pH of the image layer must be kept at a functional transfer level, for example, 12 to 14 until the dye image has been formed which the pH is reduced very rapidly to a pH below that at which dye transfer may be accomplished, for example, at least about 11 and preferably about pH 9 to 10. Unoxidized dye developers containing hydroquinonyl developing radicals diffuse from the negative to the positive as the sodium or other alkali salt. The diffusion rate of such dye image-forming components thus is at least partly a function of the alkali concentration, and it is necessary that the pH of the image layer remain on the order of, for example, 12 to 14 until transfer of the necessary quantity of dye has been accomplished. The subsequent pH reduction, in addition to its desirable effect upon image light stability, serves a highly valuable photographic function by substantially terminating further dye transfer.

In order to prevent premature pH reduction during transfer processing, as evidenced, for example, by an undesired reduction in positive image density, the acid material is disclosed to be so distributed in the acid polymer layer that the rate of its availability to the alkali is controllable, e.g., as a function of the rate of swelling of the polymer layer which rate in turn has a direct relationship to the diffusion rate of the alkali ions. The desired distribution of the acid material in the acid polymer layer may be effected by mixing acid polymer with a polymer free of acid groups, or lower in concentration of acid groups, and compatible therewith, or by using only acid polymer but selecting one having a relatively lower proportion of acid groups. These embodiments are illustrated, respectively in the cited copending application, by (a) a mixture of cellulose acetate and cellulose acetate hydrogen phthalate and (b) a cellulose acetate hydrogen phthalate polymer having a much lower percentage of phthalyl groups than the first-mentioned cellulose acetate hydrogen phthalate.

It is also there disclosed that the polymeric acid layer may contain a water-insoluble polymer, preferably a cellulose ester, which acts to control or modulate the rate at which the alkali salt of the acid material is formed. As examples of cellulose esters contemplated for use, mention is made of cellulose acetate, cellulose acetate butyrate, etc. The particular polymers and combinations of polymers employed in any given embodiment are, of course, selected so as to have adequate wet and dry strength and when necessary or desirable, siutable subcoats are employed to help the various polymeric layers adhere to each other during storage and use.

The inert spacer layer of the last-mentioned patent, for example, an inert spacer layer comprising polyvinyl alcohol or gelatin, acts to "time" control the pH reduction by the polymeric acid layer. This timing is disclosed to be a function of the rate at which the alkali diffuses through the inert spacer layer. It is there stated to have been found that the pH does not drop until the alkali has passed through the spacer layer, i.e., the pH is not reduced to any significant extent by the mere diffusion into the interlayer, but the pH drops quite rapidly once the alkali diffuses through the spacer layer.

It has now been unexpectedly discovered that novel photographic film units which comprise photosensitive silver halide having associated therewith an effective concentration of a 9-pyridyl fluorene optical filter agent and preferably a 9-(N-alkylpyridyl)-fluorene agent of the formula:

(A)

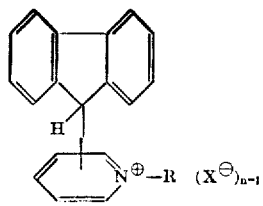

wherein R is an alkyl group; X is an anion; and $n$ is the integer 1 when R is negatively charged and the integer 2 when R is electrically neutral; are particularly adapted for employment in diffusion transfer photographic processes and, in particular, for the production of a dye transfer image by color diffusion transfer processes and, preferably, color diffusion transfer processes of the type described in a forementioned U.S. Pats. Nos. 2,986,606; 3,-415,644; 3,415,645; and 3,415,646.

Specifically, it has been quite unexpectedly discovered that novel photographic film units particularly adapted for production of a transfer image by diffusion transfer processes may be constructed to include a photosensitive element containing a photosensitive silver halide emulsion layer having associated therewith a transfer image providing material processing composition soluble and diffusible as a function of exposure of the photosensitive silver halide of the emulsion and an optical filter agent of the last-denoted class adapted, subsequent to selected exposure of the emulsion, to effect absorbtion of electromagnetic radiation incident on said agent without deleteriously affecting either the composition of and/or the development of a latent image carried by the emulsion, and a diffusion transfer image-receiving element.

In a preferred embodiment of the present invention, the novel film unit will be specifically constructed to be adapted to provide a dye transfer image by color diffusion transfer processes and the photosensitive siliver halide emulsion layer will have associated therewith a dye image-forming material processing composition soluble and diffusible as a function of exposure of the emulsion layer and the optical filter agent of the class denoted adapted, as a function of environmental pH to selectively effect absorption of incident actinic radiation, subsequent to selective exposure of the emulsion, substantially without deleterious effect on or to the latent image carried by the silver halide as a function of emulsion exposure or on or to diffusion transfer processing of the film unit.

In a particularly preferred embodiment of the present invention, the film unit will be constructed to include a photosensitive element comprising a composite structure possessing, in sequence, as essential layers, a first dimensionally stable layer, a photosensitive silver halide emulsion layer having associated therewith a dye image-forming material which is soluble and diffusible as a function of the point-to-point degree of emulsion photoexposure, a polymeric layer dyeable by the dye image-forming material, and a second dimensionally stable layer transparent to incident actinic radiation. In combination with the composite structure, a rupturable container retaining a processing composition is fixedly positioned and extends transverse a leading edge of the composite structure whereby to effect, upon application of compressive pressure, discharge of the processing composition intermediate the dyeable polymeric layer and the photosensitive silver halide emulsion and associated dye image-forming material next adjacent.

Although both dimensionally stable layers may be transparent and in such instance, a reflecting agent may be initially dispersed intermediate the dyeable polymeric layer and the next adjacent silver halide emulsion layer, in a quantity sufficient to mask the dye image-forming material, such agent will preferably be disposed within the processing composition, in a quantity sufficient to mask the dye image-forming material upon distribution of the processing composition intermediate the last-state layers, and, most preferably, the dimensionally stable layer next adjacent the photosensitive silver halide emulsion layer will be opaque with respect to externally derived incident actinic radiation.

In view of the fact that the preferred dye image-providing materials comprise dyes which are silver halide developing agents, as stated above, for purposes of simplicity and clarity, the present invention will be further described hereinafter in terms of such dyes, without limitation of the invention to the illustrative dyes denoted, and, in addition, the photographic film unit structure will be detailed hereinafter employing the last-mentioned preferred structural embodiment, without limitation of the invention to the preferred structure denoted.

In a preferred embodiment of the present invention, the film unit is specifically adapted to provide for the production of a multicolor dye transfer image and the photosensitive laminate comprises, in order of essential layers, the dimensionally stable opaque layer; at least two selectively sensitized silver halide emulsion strata each having dye image-providing materials of predetermined color associated therewith which are soluble and diffusible in alkaline processing composition as a function of the point-to-point degree of exposure of the respective associated silver halide emulsion strata; an alkaline solution permeable polymeric layer dyeable by the dye image-providing materials; and the dimensionally stable transparent layer.

The silver halide emulsions comprising the multicolor photosensitive laminate preferably possess predominant spectral sensitivity to separate regions of the spectrum and each has associated therewith a dye, which is a silver halide developing agent and is, most preferably, substantially soluble in the reduced form only at a selected pH processing subsequent to processing a spectral absorption range substantially complementary to the predominant sensitivity range of its associated emulsion.

In the preferred embodiment, each of the emulsion strata, and its associated dye, is separated from the remaining emulsion strata, and their associated dye, by separate alkaline solution permeable polymeric interlayers.

In such preferred embodiment of the invention, the silver halide emulsion comprises photosensitive silver halide dispersed in gelatin and is about 0.6 to 6 microns in thickness; the dye itself is dispersed in an aqueous alkaline solution polymeric binder, preferably gelatin, as a separate layer about 1 to 7 microns in thickness; the alkaline solution permeable polymeric interlayers are about 1 to 5 microns in thickness; the alkaline solution dyeable polymeric layer is transparent and about 0.25 to 0.4 mil. in thickness; and each of the dimensionally stable opaque and transparent layers are alkaline solution impermeable, most preferably processing composition vapor permeable and about 2 to 6 mils. in thickness. It will be specifically recognized that the relative dimensions recited above may be appropriately modified, in accordance with the desires of the operator, with respect to the specific product to be ultimately prepared.

In the preferred embodiment of the present invention's film unit for the production of a multicolor transfer image, the respective silver halide/dye developer units of the photosensitive element will be in the form of a tripack configuration which will ordinarily comprise a cyan dye developer/red-sensitive emulsion unit contiguous the dimensionally stable opaque layer, the yellow dye developer/blue-sensitive emulsion unit most distant from the opaque layer and the magenta dye developer/green-sensitive emulsion unit intermediate those units, recognizing that the relative order of such units may be varied in accordance with the desires of the operator.

Preferred optical filter agents within preceding Formula A comprise 9-[2-(N-alkyl)-pyridyl]-fluorene compounds of the formula:

(B)
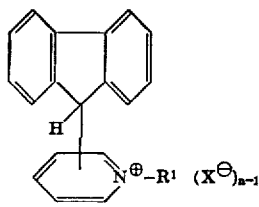

wherein R¹ is a lower alkyl group and X possesses the same definition as in Formula A.

As specific examples of particularly preferred optical filter agents with preceding Formula B, mention may be made of:

(C)
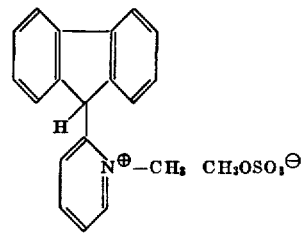

(D)
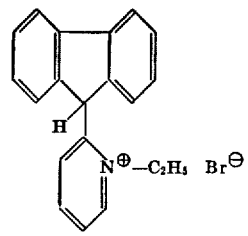

(E)
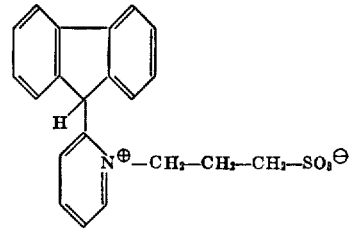

(F)
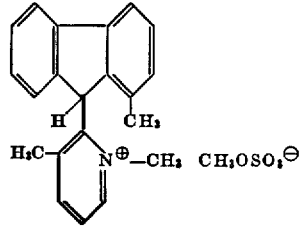

Compounds of Formula B wherein R is

—CH$_2$—CH$_2$—CH$_2$—SO$_3$⁻ comprise specifically preferred 9-[2-(N-alkyl)-pyridyl]-fluorene optical filter agents for employment in the practice of the present invention.

The anion, represented by the designation X in Formulae A and B, comprises those anionic acid radicals customary in the art, for example, chloride, bromide, iodide, p-toluenesulfonate, acetate, propionate, nitrate, sulfate, etc.

The optical filter agents employed in accordance with the present invention may be prepared by reacting a bromopyridine and in the particularly preferred embodiments, a 2-bromopyridine, with a 2-fluorenone in the presence of lithium metal, reducing the resultant product and quaternizing the reduced product with a selected alkylating agent.

In accordance with the preceding synthetic procedure,

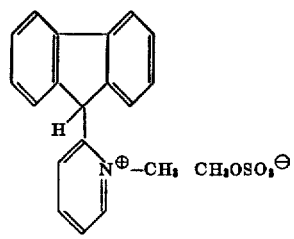

has been prepared by reacting 28.8 grams of

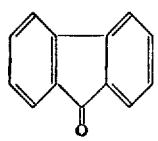

2-fluorenone, dissolved in 40 cc. of ethyl ether and 28.4 grams of

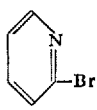

2-bromopyridine, dissolved in 40 cc. of ethyl ether in the presence of 2.76 grams of lithium metal in 200 cc. of ethyl ether and 27.4 grams of n-butyl bromide in 40 cc. of ethyl ether to provide 21.5 grams of

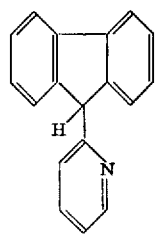

possessing a melting point at 132 to 1330 C. and with respect to 5.0 grams of which there was then reacted 7 cc. of dimethylsulfate, $(CH_3O)_2SO_2$, in 3.5 cc. of benzene under gentle reflux for 3 hours to provide a reaction mixture containing the desired product which was separated by cooling of the mixture and filtration of the resultant precipitated product. The product was then washed with benzene, dried in vacuo over Drierite at 50° C., redissolved in ethanol and reprecipitated with ethyl ether to provide 1.2 grams of product possessing a melting point at 176 to 177° C.

*Analysis.*—Calculated as $C_{20}H_{19}NSO_4$ (percent): C, 65.09; H, 5.16; N, 3.80; S, 8.69; O, 17.34. Found (percent): C, 65.04; H, 5.00; N, 3.63; S, 8.69; O, 17.31.

The optical filter agent

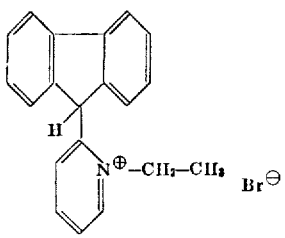

has been prepared by reacting 8.0 grams of

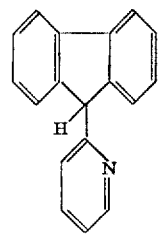

prepared as above, dissolved in 20 cc. of cyclohexanone with 10 grams of ethyl bromide under reflux for 96 hours. The resultant product was separated from the reaction mixture by filtration, washed with hexane and recrystallized from ethanol to yield 600 milligrams of product possessing a melting point at 281 to 283° C.

*Analysis.*—Calculated as $C_{20}H_{18}NBr$ (percent): C, 68.24; H, 5.15; N, 3.98; Br, 22.70. Found (percent): C, 68.07; H, 5.22; N, 3.91; Br, 22.67.

The optical filter agent

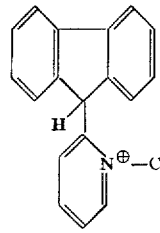

has been prepared by reacting 8.0 grams of

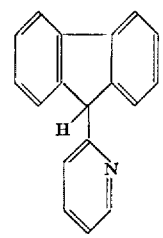

prepared as above and 8.0 grams of

propane sultone, in admixture, at an initial temperature of about 80 to 90° C., which temperature quickly rose to about 150° C., for 10 minutes and subsequent to which the reaction mixture was allowed to cool from room temperature. The resultant solid product was washed with about 400 cc. of dimethyl ketone and extracted in a Soxlet with a 4:1 ethanol/water mixture to provide 8.0 grams of product possessing a melting point at 335 to 337° C.

*Analysis.*—Calculated as $C_{21}H_{19}NSO_3$ (percent): C, 69.05; H, 5.25; N, 3.84; S, 8.79; O, 13.15. Found (percent): C, 68.93; H, 5.36; N, 3.95; S, 8.87; O, 1321.

In accordance with the preceding synthetic procedure

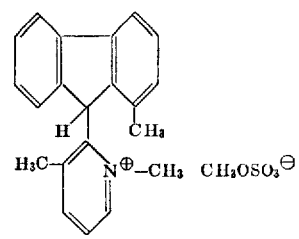

has been prepared by reacting 24.0 grams of

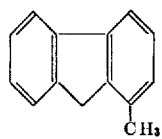

1-methyl-fluorene in 140 cc. of dry pyridine and 3.5 cc. of a 40% pyridine solution of

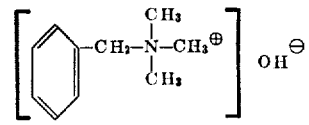

for 3 hours, acidifying the reaction mixture with glacial acetic acid and concentrating the mixture by flash evaporation to a volume of 75 cc. The residual liquor was then poured into 400 cc. of water and the resultant yellow precipitate removed by suction filtration, washed with water, and then recrystallized from methanol to provide 14.5 grams of

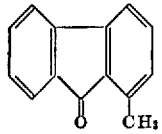

1-methyl fluorenone possessing a melting point at 93 to 94° C.

*Analysis.*—Calculated as $C_{14}H_{10}O$ (percent): C, 86.64; H, 5.20; O, 8.25. Found (percent): C, 86.82; H, 5.17; O, 8.16.

To a solution comprising 240° cc. of n-butyl lithium and 70 cc. of anhydrous ethyl ether was then added 10.5 grams of 2-bromo-3-methyl pyridine in 35 cc. of anhydrous ethyl ether under nitrogen and at a temperature of −60 to −40° C. The reaction mixture was cooled to −60° C. and a solution comprising 14.0 grams of 1-methyl-fluorenone was then added maintaining the reaction temperature within the range of −60 to −40° C. during addition. The reaction mixture temperature was then raised to 20° C. and 25 cc. of 25% ammonium chloride was added dropwise to provide separation of the mixture into an organic ether phase and an aqueous phase. The ether phase was then separated and concentrated to a volume of 60 cc. and resultant precipitate separated by suction filtration and recrystallized from benzene to provide 70 grams of

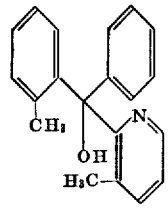

9-(2'-γ-picolyl) - 1 - methylfluorenol possessing a melting point at 135 to 136° C.

*Analysis.*—Calculated as $C_{20}H_{17}NO$ (percent): C, 83.65; H, 5.97; N, 4.88; O, 5.57. Found (percent): C, 3.80; H, 6.06; N, 4.79; O, 5.70.

A mixture comprising 6.0 grams of 9-(2'-γ-picolyl)-1-methylfluorenol and 50 cc. of 47% hydroiodic acid was then refluxed until colorless and the excess acid distilled until the reaction temperature reached 130° C. The solution was cooled and poured slowly into 100 cc. of concentrated ammonium hydroxide and the resultant precipitate separated by suction filtration, washed with water, dried over Drierite at 50° C. in vacuo, and recrystallized from hexane to provide 4.5 grams of

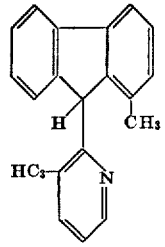

9-(2'-γ-picolyl) - 1 - methylfluorene possessing a melting point at 94 to 95° C.

*Analysis.*—Calculated as $C_{20}H_7N$ (percent): C, 88.63; H, 6.30; N, 5.15. Found (percent): C, 88.66; H, 6.23; N, 5.27.

A solution comprising 2.5 grams of 9-(2'-γ-picolyl)-1-methylfluorene in 20 cc. of benzene and 4.5 cc. of dimethyl sulfate was then refluxed for 3 hours, the reaction mixture concentrated to a volume of 10 cc. and the residual viscous mass triturated in ethyl ether until an amorphous residue obtained. The residue was dissolved in the minimal amount of ethanol required and reprecipitated with ether to provide 3.1 grams of the filter agent

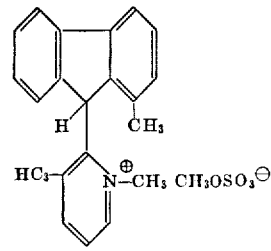

2 - (1'-methyl-9'-fluorenyl)-1-methyl-α-picolinium methosulfate possessing a melting point at 151 to 153° C.

*Analysis.*—Calculated as $C_{22}H_{23}NSO_4$ (percent): C, 66.50; H, 5.84; N, 3.53; S, 8.08; O, 16.12. Found (percent): C, 66.72; H, 5.58; N, 3.71; S, 7.94; O, 16.24.

It will be recognized, from the preceding discussion, that R is intended to encompass the equivalents thereof and, accordingly, may comprise a substituted alkyl, or aliphatic, group, and that the six-membered aromatic and heterocyclic rings denoted may optionally contain substituents such as alkyl groups which do not deleteriously interfere with the photographic functionality of the resultant optical filter agent.

Reference is now made to FIGS. 1 through 7 of the drawings wherein there is illustrated a preferred film unit of the present invention and wherein like numbers, appearing in the various figures, refer to like components.

As illustrated in the drawings, FIG. 1 sets forth a perspective view of the film unit, designated 10, and each of FIGS. 2 through 7 illustrate diagrammatic cross-sectional veiws of film unit 10, along the stated section lines 2—2, 3—3, 5—5 and 7—7, during the various depicted stages in the performance of a photographic diffusion transfer process as detailed hereinafter.

Film unit 10 comprises rupturable container 11, retaining, prior to processing, aqueous alkaline solution 12, and photosensitive laminate 13 including, in order, dimensionally stable opaque layer 14, preferably an actinic radiation-opaque flexible sheet material; cyan dye developer layer 15; red-sensitive silver halide emulsion layer 16; interlayer 17; magenta dye developer layer 18; green-sensitive silver halide emulsion layer 19; interlayer 20; yellow dye developer layer 21; blue-sensitive silver halide emulsion layer 22; auxiliary layer 23, which may contain an auxiliary silver halide developing agent; image-receiving layer 24; and dimensionally stable transparent layer 27, preferably an actinic radiation transmissive flexible sheet material.

The structural integrity of laminate 13 may be maintained, at least in part, by the adhesive capacity exhibited between the various layers comprising the laminate at their opposed surfaces. However, the adhesive capacity exhibited at an interface intermediate image-receiving layer 24 and the silver halide emulsion layer next adjacent thereto, for example, intermediate image-receiving layer 24 and auxiliary layer 23 as illustrated in FIGS. 2 through 7, should be less than that exhibited at the interface between the opposed surfaces of the remainder of the layers forming the laminate, in order to facilitate distribution of processing solution 12 intermediate the stated image-receiving layer 24 and the silver halide emulsion layer next adjacent thereto. The laminate's structural integrity may also be enhanced or provided, in whole or in part, by providing a binding member extending around, for example, the edges of laminate 13, and maintaining the layers comprising the laminate intact, except at the interface between layers 23 and 24 during distribution of alkaline solution 12 intermediate those layers. As illustrated in the figures, the binding member may comprise a pressure-sensitive tape 28 securing and/or maintaining the layers of laminate 13 together at its respective edges. Tape 28 will also act to maintain processing solution 12 intermediate image-receiving layer 24 and the silver halide emulsion layer next adjacent thereto, upon application of compressive pressure to pod 11 and distribution of its contents intermediate the stated layers. Under such circumstances, binder tape 28 will act to prevent leakage of fluid processing composition from the film unit's laminate during and subsequent to photographic processing.

Rupturable container 11 may be of the type shown and described in any of U.S. Pats. Nos. 2,543,181; 2,634,886; 2,653,732; 2,723,051; 3,056,492; 3,056,491; 3,152,515; and the like. In general, such containers will comprise a rectangular blank of fluid- and air-impervious sheet material folded longitudinally upon itself to form two walls 29 which are sealed to one another along their longitudinal and end margins to form a cavity in which processing solution 12 is retained. The longitudinal marginal seal 30 is made weaker than the end seals 31 so as to become unsealed in response to the hydraulic pressure generated within the fluid contents 12 of the container by the application of compressive pressure to walls 29 of the container.

As illustrated in FIGS. 1, 2 and 4, container 11 is fixedly positioned and extends transverse a leading edge of photosensitive laminate 13 whereby to effect unidirectional discharge of the container's contents 12 between image-receiving layer 24 and the stated layer next adjacent thereto, upon application of compressive force to container 11. Thus, container 11, as illustrated in FIG. 2, is fixedly positioned and extends transverse a leading edge of laminate 13 with its longitudinal marginal seal 30 directed toward the interface between image-receiving layer 24 and auxiliary layer 23. As shown in FIGS. 1, 2 and 4, container 11 is fixedly secured to laminate 13 by extension 32 of tape 28 extending over a portion of one wall 29 of the container, in combination with a separate retaining member such as illustrated retaining tape 33 extending over a portion of laminate 13's surface generally equal in area to about that covered by tape 28.

As illustrated in FIG. 6, extension flap 32 of tape 28 is preferably of such area and dimensions that upon, for example, manual separation of container 11 and tape 33, subsequent to distribution of processing composition 12, from the remainder of film unit 10, flap 32 may be folded over the edge of laminate 13, previously covered by tape 33, in order to facilitate maintenance of the laminate's structural integrity, for example, during the flexations inevitable in storage and use of the processed film unit, and to provide a suitable mask or frame, for viewing of the transfer image through the picture viewing area of transparent layer 27.

The fluid contents of the container comprise an aqueous alkaline solution, having a pH and solvent concentration at which the dye developers are soluble and diffusible, which contains a reflecting agent in a quantity sufficient to mask the dye developers associated with the silver halide emulsions subsequent to processing and additionally contains an optical filter agent of the class denoted above.

In general, in a preferred embodiment, a concentration of reflecting agent or agents and optical filter agent or agents selected will be that sufficient to prevent further exposure of the film unit's silver halide emulsion or emulsions, by actinic radiation traversing through the dimensionally stable transparent layer, subsequent to distribution of processing solution intermediate the dyeable polymeric layer and the stated layer next adjacent thereto. Accordingly, the film unit may be processed, subsequent to distribution of the composition, in the presence of such radiation, in view of the fact that the silver halide emulsion or emulsions of the laminate are appropriately protected from incident radiation, at one major surface by the distributed reflecting and optical filter agents and at the remaining major surface by the dimensionally stable opaque layer. If the illustrated binder tapes are also opaque, edge leakage of actinic radiation incident on the emulsion or emulsions will also be prevented. The selected reflecting agent, however, should be one providing a background suitable for viewing the dye developer transfer image formed in the dyeable polymeric layer. In general, while substantially any reflecting agent may be employed, it is preferred that an agent be selected that will not interfere with the color integrity of the dye transfer image, as viewed by the observer, and, most preferably, an agent which is aesthetically pleasing to the viewer and does not provide a background noise signal degrading, or detracting from, the information content of the image. Particularly desirable reflecting agents will be those providing a white background, for viewing the transfer image, and specifically those conventionally employed to provide background for reflection protographic prints and, especially, those agents possessing the optical properties desired for reflection of incident radiation.

As examples of reflecting agents, mention may be made of barium sulfate, zinc oxide, titanium oxide, barium stearate, silver flake, silicates, alumina, zirconium oxide, zirconium acetyl acetate, sodium zirconium sulfate, kaolin, mica, and the like.

A particularly preferred agent comprises titanium dioxide due to its highly effective reflection properties. In general, based upon percent titanium dioxide (weight volume), a processing composition containing about 40–70 grams of titanium dioxide dispersed in 100 cc. of water will provide a percent reflectance of about 85–90%. In the most preferred embodiments, the percent reflectance particularly desired will be in the order of about 85%.

Where it is desired to increase the radiation filtering capacity of a processing composition containing a reflecting agent such as, for example, titanium dioxide or the like, selected predominantly for its radiation reflecting properties, and the denoted optical filter agent beyond that ordinarily obtained, it may also be desirable to provide additional opacifying agent or agents providing additional filtration of radiation or selective spectral portions thereof incident on the transparent support layer during processing, such as carbon black, for example, added in a concentration of about one part carbon black to 100 to 500 parts titanium dioxide, in order to further protect the emulsions from physical fog formation during processing.

The optical filter agents of the class denoted above absorb incident actinic radiation at selective alkaline pH ranges and are conveniently soluble in alkaline processing composition, relatively stable, and without adverse action on conventional developing agents and/or on the latent image provided by selected photoexposure of the silver halide emulsion or emulsions employed. In general, the compounds denoted are substantially nonfogging, nonstaining and nonpoisonous and, although, in the preferred embodiment, the agent or agents selected will be disposed in a processing composition possessing an initial alkaline pH at which the agent or agents selected are adapted to absorb incident actinic radiation as retained in the rupturable container, alternatively such agent or agents may be conveniently dispersed in any processing composition permeable layer of the composite film unit structure intermediate the photosensitive silver halide layer to be protected from incident actinic radiation and the exposure surface of the film unit, at an environmental pH at which the agent or agents selected do not substantially absorb incident actinic radiation prior to photoexposure of the film unit, and activated by contact with alkaline processing composition permeating such layer and thereby providing the environmental pH at which the agent or agents selected absorb incident actinic radiation capable of fogging the photosensitive silver halide layer during processing.

In general, although the optical filter agents of the present invention may thus be employed in any processing composition permeable layer of the preferred composite film units intermediate the photosensitive silver halide emulsion or emulsions to be protected from physical fog formation during processing and the transparent support layer, in the specifically preferred film unit embodiments, the optical filter agents are initially disposed within an alkaline processing solution, in order to obviate the necessity of converting the filter agent from a substantially nonabsorber of actinic radiation desired to effect photoexposure of the film unit to the desired radiation absorbing species during processing, by alkaline processing composition contact, subsequent to selective photoexposure of the film unit and to thus maximize isolation of their effects from the photosensitive silver halide crystals prior to photoexposure. Although the optimum concentration of optical filter agents to be employed should be determined empirically for each photographic system, in general, the concentration of agent to be employed ordinarily will be within the range of about 1500 to 4000 mgs./ft.$^2$ coverage of the silver halide emulsion or emulsions to be protected from incident radiation during processing, depending upon the sensitivity characteristics of such emulsion. Although concentrations in excess of the mentioned range may be employed, increasing the concentration beyond the designated limits generally provides no particularly beneficial additional results in the preferred embodiments denoted. Conversely, concentrations below that of the designated range, however, merely decrease protection of the emulsions below the effective level generally sought in the preferred embodiments described above, but do not negate the obtaining of optical filtration effects.

It will thus be recognized that the quantum of optical filtration required for processing of a selected film unit, in the presence of actinic radiation, will be in part determined by the sensitivity of the silver halide emulsions to the incident actinic radiation in question and the efficiency of such reflecting and masking procedures as are adopted to insulate silver halide from response to such radiation. In general, a transmission optical density of about 6.0 is effective to protect a photosensitive silver halide emulsion providing a diffusion transfer exposure index in the range of about 75 processed for one minute in sunlight of the intensity of a noon summer sun. It is understood that in the performance of the present invention, the optical filter and the like agents employed should protect the silver halide emulsions by absorption in all visible and nonvisible sections of the spectrum to which the emulsions are sensitive.

It will thus be recognized that employment of the detailed film unit described above, according to the herein further described color diffusion transfer process, specifically facilitates the production of color transfer image formation by diffusion transfer processing of a photoexposed film unit in the presence of radiation actinic to such unit by alleviation of the formation of physical fog resultant from actinic radiation incident on the exposure surface of such film unit during transfer processing.

In such instances where it is particularly desired to employ one or more optical filter agents of a type or in a concentration which may induce chemical fog formation in emulsion strata, in addition to the desired optical filtration, such chemical fog formation may be obviated, to the extent required, by the presence of one or more conventional antifoggants employed in a concentration effective to provide the desired chemical fog inhibition. Embodiments of the present invention employing a plurality of superpositioned emulsion strata and disposition of one or more of the optical filter agents in the processing composition or compositions utilized may advantageously employ one or more antifoggants possesing a sufficiently low mobility as to be effective for inhibition of chemical fog formation in the emulsion stratum in most direct contact with the processing composition, substantially without photographic effect on emulsion strata positioned more distant from initial processing composition contact, in instances where the selected concentration of optical filter agent desired to effect protection of the emulsion strata during processing is such as to provide chemical fog formation of the emulsion stratum in initial contact with the processing composition. Thus, for example, in the tripack film unit configuration described above, a low mobility antifoggant may be employed to alleviate chemical fogging of the blue-sensitive silver halide emulsion stratum, without substantial effect on the green- and red-sensitive silver halide emulsion strata, where it is specifically desired to employ a processing composition containing optical filter agent in a concentration which may induce chemical fogging of the blue-sensitive emulsion stratum, contacted initially by such composition during the described diffusion transfer processing.

In the performance of a diffusion transfer multi-color process employing film unit 10, the unit is exposed to radiation, actinic to photosensitive laminate 13, incident on the laminate's exposure surface 34, as illustrated in FIG. 2.

Subsequent to exposure, as illustrated by FIGS. 2 and 4, film unit 10 is processed by being passed through opposed suitably gapped rolls 35 in order to apply compressive pressure to frangible container 11 and to effect rupture of longitudinal seal 30 and distribution of alkaline processing composition 12, having a pH and solvent concentration at which the cyan, magenta and yellow dye developers are soluble and diffusible, intermediate dyeable polymeric layer 24 and auxiliary layer 23 and possessing reflecting agent and optical filter agent of the class denoted in a concentration effective to substantially protect emulsion layers 16, 19 and 22 from further exposure by actinic radiation incident on transparent layer 27.

Alkaline processing solution 12 permeates emulsion layers 16, 19 and 22 to initiate development of the latent images contained in the respective emulsions. The cyan, magenta and yellow dye developers of layers 15, 18 and 21 are immobilized as a function of the development of their respective associated silver halide emulsions, preferably substantially as a result of their conversion from the reduced form to their relatively insoluble and nondiffusible oxidized form, thereby providing imagewise distributions of mobile, soluble and diffusible cyan, magenta and yellow dye developer, as a function of the point-to-point degree of their associated emulsions' exposure. At least part of the imagewise distributions of mobile cyan, magenta and yellow dye developer transfers, by diffusion, to aqueous alkaline solution permeable polymeric layer 24 to provide a multicolor dye transfer image to that layer.

Subsequent to distribution of processing solution 12, container 11 may be manually dissociated from the remainder of the film unit, as described above, to provide the product illustrated in FIG. 6.

The present invention will be further illustrated and detailed in conjunction with the following illustrative constructions which set out representative embodiments and photographic utilization of the novel photographic film units of this invention, which, however, are not limited to the details therein set forth and are intended to be illustrative only.

Film units similar to that shown in the drawings may be prepared, for example, by coating, in succession, on a gelatin subbed, 4 ml. opaque polyethylene terephthalate film base, the following layers:

(1) A layer of the cyan dye developer 1,4-bis-($\beta$-[hydroquinonyl - $\alpha$ - methyl] - ethylamino) - 5,8 - dihydroxyanthraquinone dispersed in gelatin and coated at a coverage of about 80 mgs./ft.$^2$ of dye and about 100 mgs./ft.$^2$ of gelatin;

(2) A red-sensitive gelatino-silver iodobromide emulsion coated at a coverage of about 225 mgs./ft.$^2$ of silver and about 50 mgs./ft.$^2$ of gelatin;

(3) A layer comprising the acrylic latex sold by Rohm and Haas Co. under the trade designation AC–61 and polyacrylamide coated at a coverage of about 150 mgs./ft.$^2$ of AC–61, and about 5 mgs./ft.$^2$ of polyacrylamide;

(4) A layer of the magenta dye developer 2 - (p-[β-hydroquinonylethyl] - phenylazo) - 4 - isopropoxy - 1-naphthol dispersed in gelatin and coated at a coverage of 70 mgs./ft.$^2$ of dye and about 120 mgs./ft.$^2$ of gelatin;

(5) A green-sensitive gelatino-silver iodobromide emulsion coated at a coverage of about 120 mgs./ft.$^2$ of silver and 60 mgs./ft.$^2$ of gelatin;

(6) A layer comprising the acrylic latex sold by Rohm and Haas Co. under the trade designation B–15 and polyvinylacrylamide coated at a coverage of about 100 mgs./ft.$^2$ of B–15 and about 10 mgs./ft.$^2$ of polyvinylacrylamide;

(7) A layer of the yellow dye developer 4-(p-[β-hydroquinonylethyl]-phenylazo) - 3 - (N - n - hexylcarboxamido)-1-phenyl-5-pyrazolone and the auxiliary developer 4'-methylphenyl hydroquinone dispersed in gelatin and coated at a coverage at about 50 mgs./ft.$^2$ of dye, 15 mgs./ft.$^2$ of auxiliary developer and about 75 mgs./ft.$^2$ of gelatin;

(8) A blue-sensitive gelatino-silver iodobromide emulsion coated at a coverage of about 75 mgs./ft.$^2$ of silver and about 20 mgs./ft.$^2$ of gelatin; and (9) A layer of gelatin coated at a coverage of about 50 mgs./ft.$^2$.

Then a transparent 4 mil. polyethylene terephthalate film base may be coated, in succession, with the following illustrative layers:

(1) A 7:3 mixture, by weight, of polyethylene/maleic acid copolymer and polyvinyl alcohol, at a coverage of about 1400 mgs./ft.$^2$, to provide a polymeric acid layer;

(2) A graft copolymer of acrylamide and diacetone acrylamide on a polyvinyl alcohol backbone in a molar ratio of 1:3.2:1, at a coverage of 800 mgs./ft.$^2$, to provide a polymeric spacer layer; and (3) A 2:1 mixture, by weight, of polyvinyl alcohol and poly-4-vinylpyridine, at a coverage of about 900 mgs./ft.$^2$ and including about 20 mgs./ft.$^2$ phenyl mercapto tetrazole, to provide a polymeric image-receiving layer.

The two components thus prepared may then be taped together in laminate form, at their respective edges, by means of a pressure-sensitive binding tape extending around, in contact with, and over the edges of the resultant laminate.

A rupturable container comprising an outer layer of lead foil and an inner liner or layer of polyvinyl chloride retaining an aqueous alkaline processing solution comprising:

|  | Grams |
|---|---|
| Water, cc | 100 |
| Potassium hydroxide 86% | 8.0 |
| Hydroxyethyl cellulose (high viscosity) [commercially available from Hercules Powder Co., Wilmington, Delaware, under the trade name Natrasol 250] | 3.4 |
| N-phenethyl-α-picolinium bromide | 1.37 |
| Titanium dioxide | 50.00 |
| 6-bromo-5-methyl-4-azabenzimidazole | 0.23 |
| | 0.50 |

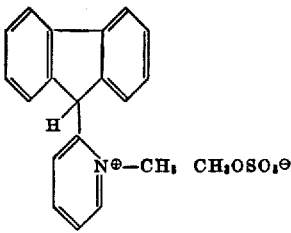

may then be fixedly mounted on the leading edge, of each of the laminates, by pressure-sensitive tapes interconnecting the respective containers and laminates, such that upon application of compressive pressure to a container its contents would be distributed, upon rupture of the container's marginal seal, between layer 9 and the polymeric image-receiving layer.

The photosensitive laminates may then be exposed through step wedges to selectively filtered radiation incident on the transparent polyethylene terephthalate layer and initially processed, in the absence of actinic radiation, by passage of the exposed film unit through suitably gapped opposed rolls, to effect rupture of the container and distribution of its contents. Subsequent thereto, for example, in the order of less than about 150 to 600 milliseconds, the film unit's processing may be contained in the presence of actinic radiation. The multicolor dye transfer image formation may be viewed through the transparent polyethylene terephthalate film base and such image formation is found to be substantially completed and exhibiting the required color brilliance, hues, saturation, stability and isolation, within a period of approximately 2 minutes.

Examination of test multicolor dye transfer images, formulated in the general manner detailed above, in comparison with control transfer images, formulated identically with the exception that the optical filter agent was absent from the processing composition, clearly revealed decreased physical fog formation resultant from actinic radiation incident on the film unit's photosensitive silver halide emulsions during processing.

Specifically, a test and control experiment, formulated in the general manner detailed above, provided the following tabular data:

I. Positive Transfer Image Density Corresponding to Unexposed Negative Area

|  | Test | Control |
|---|---|---|
| Red light absorption | 0.40 | 0.21 |
| Green light absorption | 1.68 | 0.44 |
| Blue light absorption | 2.20 | 1.09 |

II. Positive Transfer Image Density Corresponding to Negative Area Exposed to 2 mcs. White Light

|  | Test | Control |
|---|---|---|
| Red light absorption | 0.19 | 0.19 |
| Green light absorption | 0.26 | 0.26 |
| Blue light absorption | 0.26 | 0.28 |

III. Positive Transfer Image Density Resultant From 2 mcs. Exposure of Film Unit

|  | Test | Control |
|---|---|---|
| Blue and green light exposure (red light absorption) | 0.94 | 0.23 |
| Blue and red light exposure (green light absorption) | 0.90 | 0.52 |
| Green and red light exposure (blue light absorption) | 1.40 | 0.88 |
| Red light exposure (blue light absorption) | 2.24 | 1.12 |
| Green light exposure (blue light absorption) | 1.44 | 0.82 |
| Blue light exposure (red light absorption) | 0.82 | 0.33 |

The preceding test embodiment may be reproduced, in concert with a corresponding control, employing in substitution for the optical filter agent of that test embodiment, 0.28 grams of

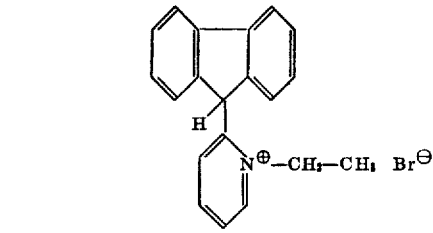

to provide the following tabular data:

I. Positive Transfer Image Density Corresponding to Unexposed Negative Area

|  | Test | Control |
|---|---|---|
| Red light absorption | 0.49 | 0.30 |
| Green light absorption | 1.54 | 0.64 |
| Blue light absorption | 2.14 | 1.25 |

II. Positive Transfer Image Density Corresponding to Negative Area Exposed to 2 mcs. White Light

|  | Test | Control |
|---|---|---|
| Red light absorption | 0.22 | 0.24 |
| Green light absorption | 0.33 | 0.35 |
| Blue light absorption | 0.44 | 0.49 |

III. Positive Transfer Image Density Resultant From 2 mcs. Exposure of Film Unit

|  | Test | Control |
|---|---|---|
| Blue and green light exposure (red light absorption) | 0.53 | 0.26 |
| Blue and red light exposure (green light absorption) | 0.88 | 0.63 |
| Green and red light exposure (blue light absorption) | 1.32 | 1.00 |
| Red light exposure (blue light absorption) | 1.90 | 1.08 |
| Green light exposure (blue light absorption) | 1.36 | 1.02 |
| Blue light exposure (red light absorption) | 0.72 | 0.39 |

The preceding test embodiment may also be reproduced, in concert with a corresponding control, employing, distribution of the last-identified optical agent with the photosensitive element by coating a transparent 4 mil. polyethylene terephthalate film base, in succession, with a 7:3 mixture, by weight, of polyethylene/maleic acid copolymer and polyvinyl alcohol, at a coverage of about 950 mgs./ft.$^2$, to provide a polymeric acid layer; a 9:1 mixture, by weight, of polyvinyl acetate and styrene/maleic anhydride, at a coverage of about 1000 mgs./ft.$^2$, to provide a polymeric spacer layer; a 2:1 mixture, by weight, of polyvinyl alcohol and poly-4-vinyl pyridine, including phenylmercapto tetrazole at about 1.5%, by weight, of polyvinyl alcohol, at a coverage of about 950 mgs./ft.$^2$, to provide a polymeric image-receiving layer; and a layer comprising a 1:1 mixture, by weight, of the last-identified optical filter agent dispersed in gelatin and coated at a pH of 5.5 and a coverage of 80 mgs./ft.$^2$.

The resultant structure may be incorporated into a composite film unit in the manner detail above and processed as above with a pH 14+aqueous alkaline processing composition comprising:

| Water | cc | 100 |
|---|---|---|
| Hydroxyethyl cellulose | gms | 3.40 |
| Titanium dioxide | gms | 50.00 |
| Potassium hydroxide 86% | gms | 9.00 |
| N-benzyl-α-picolinium bromide | gms | 1.73 |
| Benzotriazole | gms | 1.15 | to provide the following tabular data:

I. Positive Transfer Image Density Corresponding to Unexposed Negative Area

|  | Test | Control |
|---|---|---|
| Red light absorption | 1.46 | 0.26 |
| Green light absorption | .164 | 0.59 |
| Blue light absorption | 2.08 | 1.74 |

II. Positive Transfer Image Density Corresponding to Negative Area Exposed to 2 mcs. White Light

|  | Test | Control |
|---|---|---|
| Red light absorption | 0.25 | 0.23 |
| Green light absorption | 0.30 | 0.27 |
| Blue light absorption | 0.40 | 0.36 |

III. Positive Transfer Image Density Resultant From 2 mcs. Exposure of Film Unit

|  | Test | Control |
|---|---|---|
| Blue and green light exposure (red light absorption) | 0.33 | 0.21 |
| Blue and red light exposure (green light absorption) | 1.38 | 0.33 |
| Green and red light exposure (blue light absorption) | 1.58 | 1.74 |
| Red light exposure (blue light absorption) | 1.99 | 1.89 |
| Green light exposure (blue light absorption) | 1.53 | 1.70 |
| Blue light exposure (red light absorption) | 0.50 | 0.24 |

The first-mentioned test embodiment may also be reproduced, in concert with a corresponding control, employing in substitution for the identified optical filter agent of the test embodiment, 0.2 gram of

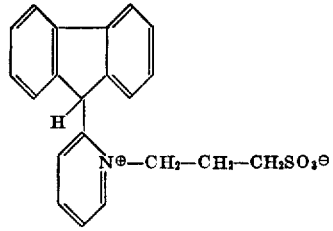

to provide the following tabular data:

I. Positive Transfer Image Density Corresponding to Unexposed Area

|  | Test | Control |
|---|---|---|
| Red light absorption | 0.34 | 0.29 |
| Green light absorption | 0.66 | 0.42 |
| Blue light absorption | 1.34 | 0.78 |

II. Positive Transfer Image Density Corresponding to Negative Area Exposed to 2 mcs. White Light

|  | Test | Control |
|---|---|---|
| Red light absorption | 0.23 | 0.24 |
| Green light absorption | 0.29 | 0.30 |
| Blue light absorption | 0.38 | 0.44 |

III. Positive Transfer Image Density Resultant From 2 mcs. Exposure of Film Unit

|  | Test | Control |
|---|---|---|
| Blue and green light exposure (red light absorption) | 0.25 | 0.24 |
| Blue and red light exposure (green light absorption) | 0.93 | 0.38 |
| Green and red light exposure (blue light absorption) | 1.00 | 0.75 |
| Red light exposure (blue light absorption) | 1.66 | 0.82 |
| Green light exposure (blue light absorption) | 0.93 | 0.72 |
| Blue light exposure (red light absorption) | 0.58 | 0.26 |

Employment of the detailed and preferred film units of the present invention, according to the herein described color diffusion transfer process, specifically provides for the production of a highly stable dye transfer image. The stable dye transfer image is obtained irrespective of the fact that the film unit is maintained as an integral laminate unit during exposure, processing, viewing and storage of the unit, as discussed above in detail. Accordingly, multicolor dye transfer images may be provided which exhibit desired maximum and minimum dye transfer image densities; yellow, magenta and cyan dye saturation; red, green and blue hues; and color separation. These advantages are in addition to the manufacturing advantages obtained by reason of the present invention's integral color transfer film unit and which will be readily apparent from examination of the unit's parameters, that is, for example, advantages in more efficient utilization of fabricating materials and components, enhanced simplicity of film manufacture and camera design and construction, and more simplified and effectively controlled customer utilization of such film units.

The pH and solvent concentration of the processing solution initially employed must be a pH at which the dye developers employed are soluble and diffusible. Although it has been found that the specific pH to be employed may be readily determined empirically for any dye developer, or groups of dye developers, most particularly desirable dye developers are soluble at pH's above 9 and relatively insoluble at substantially any alkaline pH, in oxidized form, and the system can be readily balanced accordingly for such dye developers. In addition, although as previously noted, the processing composition, in the preferred embodiment, will include the stated film-forming viscosity-increasing agent, or agents, to facilitate spreading of the composition and to facilitate maintenance of the spread composition as a structurally stable layer of the laminate, during distribution, it is not necessary that such agent be employed as a component of the composition.

Where desired, a polymeric acid layer, for example, of the type discussed above, may be additionally incorporated, as stated, in the film unit of the present invention, to provide reduction of the alkalinity of the processing solution from a pH at which the dyes are soluble to a pH at which the dyes are substantially nondiffusible in order to advantageously stabilize the dye transfer image and/or from a pH at which the optical filter agent or agents selected absorb actinic radiation to a pH at which the filter agents do not substantially absorb radiation, when the visual color of the absorbing species is of a color, hue and/or absorption efficiency degrading, contaminating and/or reducing the efficiency of the selected reflecting agent employed. In such instance, the polymeric acid layer may be positioned intermediate the transparent support and image-receiving layer, and/or the opaque support and next adjacent emulsion/dye unit layer, and the film unit may also contain a polymeric spacer or barrier layer next adjacent the polymeric acid layer, opposite the respective support layer, as previously described.

In specific illustration of the respective magnitude of the differential in the absorption characteristics of the optical filter agents of the present invention at a pH above their pKa as compared with at an environmental pH below their pKa, illustrated by the agents denoted as Formulae C, D, E, and F, reference may be made respectively to FIGS. 8, 9, 10, and 11 wherein there is graphically illustrated the spectral absorption curves of the respective agents as solid line curves for species substantially below their respective pKa and as broken line curves for species substantially above their respective pKa.

The illustrative agents denoted in FIGS. 8, 9, 10, and 11 each possess a pKa, i.e., the pH at which about 50% of the agent is present as the lesser absorbing species and about 50% is present as the greater absorbing species, within the range of about 11.5 to 11.7.

Accordingly, in such instances as the agent or agents selected are disposed within a film unit in the path of exposing actinic radiation transmission, as previously described, such agents should be so disposed at a pH substantially below their respective pKa, preceding photoexposure of the unit, in order to substantially avoid interference with the transmission of such radiation during the selective exposure of the unit, and thereafter converted to the maximally absorbing filter agent species by contact with a processing composition possessing a pH substantially above their respective pKa, to provide maximum protection of the unit's photoresponsive element from actinic radiation entering the unit's thus protected transmission path subsequent to photoexposure. Subsequent to the necessity of so protecting the film unit's photoresponsive element during processing, the selected agent or agents may be reconverted to the lesser absorbing species by a procedure adapted to reduce the environmental pH of the respective agents to substantially lower than their pKa, for example, the pH reduction procedure denoted immediately above, for the purpose of viewing the image constituted in the photosensitive element where applicable or for the explicit purposes detailed above with respect to the composite film units described.

It will also be recognized that in those instances where the selected agent or agents are disposed in a processing composition possessing a pH substantially above their respective pKa, as detailed above, for application to the film unit, such agent or agents may be converted to the lesser absorbing species by appropriate adjustment of the environmental pH, as described above, subsequent to the time interval for which maximum protection of the employed film unit's photoresponsive element is required.

As disclosed in aforementioned U.S. Pat. No. 3,362,819, the presence of an inert spacer layer was found to be effective in evening out the various refraction rates over a wide range of temperatures, for example, by preventing premature pH reduction when imbibition is effected at temperatures above room temperature, for example at 95 to 100° F. By providing an inert spacer layer, the application discloses that the rate at which alkali is available for capture in the polymeric acid layer becomes a function of the alkali diffusion rates.

However, as disclosed in U.S. Pat. No. 3,455,686, preferably the aforementioned rate at which the cations of the alkaline processing composition, i.e., alkali ions, are available for capture in the polymeric acid layer should be decreased with increasing transfer processing temperatures in order to provide diffusion transfer color processes relatively independent of positive transfer image variations over an extended range of ambient temperatures.

Specifically, it is there stated to have been found that the diffusion rate of alkali through a permeable inert polymeric spacer layer increases with increased processing temperature to the extent, for example, that at relatively high transfer processing temperatures, that is, transfer processing temperatures above approximately 80° F., a premature decrease in the pH of the transfer processing composition occurs due, at least in part, to the rapid diffusion of alkali from the dye transfer environment and its subsequent neutralization upon contact with the polymeric acid layer. This was stated to be especially true of alkali traversing an inert spacer layer possessing permeability to alkali optimized to be effective within the temperature range of optimum transfer processing. Conversely, at temperatures below the optimum transfer processing range, for example, temperatures below approximately 40° F., the last-mentioned inert spacer layer was disclosed to provide an effective diffusion barrier timewise preventing effective transverse of the inert spacer layer by alkali having temperature depressed diffusion rates and to result in maintenance of the transfer processing environment's high pH for such an extended time interval as to facilitate formation of transfer image stain and its resultant degradation of the positive transfer images' color definition.

It is further stated in the last-mentioned U.S. Pat. No. 3,455,686 to have been found, however, that if the inert spacer layer of the print-receiving element is replaced by a spacer layer which comprises a permeable polymeric layer exhibiting permeability inversely dependent on temperature, that is, a polymeric film-forming material which exhibits decreasing permeability to solubilized alkali derived cations such as alkali metal and quaternary ammonium ions under conditions of increasing temperature, that the positive transfer image defects resultant from the aforementioned overextended pH maintenance and/or premature pH reduction are obviated.

As examples of polymers which were disclosed to exhibit inverse temperature-dependent permeability to alkali, mention may be made of: hydroxypropyl polyvinyl alcohol, polyvinyl methyl ether, polyethylene oxide, polyvinyl oxazolidone, hydroxypropyl methyl cellulose, isopropyl cellulose, partial acetals of polyvinyl alcohol such as partial polyvinyl butyral, partial polyvinyl formal, partial polyvinyl acetal, partial polyvinyl propional, and the like.

The last-mentioned specified acetals of polyvinyl were stated to generally comprise saturated aliphatic hydrocarbon chains of a molecular weight of at least 1000, preferably of about 1000 to 50,000, possessing a degree of acetalation within about 10 to 30%, 10 to 30%, 20 to 80% and 10 to 40%, of the polyvinyl alcohol's theoretical polymeric hydroxy groups, respectively, and including mixed acetals where desired.

Where desired, a mixture of the polymers is to be employed, for example, a mixture of hydroxypropyl methyl cellulose and partial polyvinyl butyral.

The dimensionally stable support layers referred to may comprise any of the various types of conventional opaque and transparent rigid or flexible materials possessing the requisite liquid impermeability and vapor transmissitivity denoted above, and may comprise polymeric films of both synthetic types and those derived from naturally occurring products. Particularly suitable materials include aqueous alkaline solution impermeable, water vapor permeable, flexible polymeric materials such as vapor permeable polymeric films derived from ethylene glycol terephthalic acid, vinyl chloride polymers; polyvinyl acetate; polyamides; polymethacrylic acid methyl and ethyl esters; cellulose derivatives such as cellulose, acetate, triacetate, nitrate, propionate, butyrate, acetate-propionate, or acetate-butyrate; alkaline solution impermeable, water vapor permeable papers; crosslinked polyvinyl alcohol; regenerated cellulose; and the like.

It will be noted that the liquid processing composition employed may contain an auxiliary or accelerating developing agent, such a p-methylaminophenol, 2,4-diaminophenol, p-benzylaminophenyl, hydroquinone, toluhydroquinone, phenylhydroquinone, 4'-methylphenyl hydroquinone, etc. It is also contemplated to employ a plurality of auxiliary or accelerating developing agents, such as a 3-pyrazolidone developing agent and a benzenoid developing agent, as disclosed in U.S. Pat. No. 3,039,869, issued June 19, 1962. As examples of suitable combinations of auxiliary developing agents, mention may be made of 1-phenyl-3-pyrazolidone in combination with p-benzylaminophenol and 1-phenyl-3-pyrazolidone in combination with 2,5-bis-ethylenimino-hydroquinone. Such auxiliary developing agents may be employed in the liquid processing composition or they may be initially incorporated, at least in part, in any one or more of the silver halide emulsion strata, the strata containing the dye developers, the interlayers, the overcoat layer, the image-receiving layer, or in any other auxiliary layer, or layers, of the film unit. It may be noted that at least a portion of the dye developer oxidized during development may be oxidized and immobilized as a result of a reaction, e.g., an energy-transfer reaction, with the oxidation product of an oxidized auxiliary developing agent, the latter developing agent being oxidized by the development of exposed silver halide. Such a reaction of oxidized developing agent with unoxidized dye developer would regenerate the auxiliary developing agent for further reaction with the exposed silver halide.

In addition, development may be effected in the presence of an onium compound, particularly a quaternary ammonium compound, in accordance with the processes disclosed in U.S. Pat. No. 3,173,786, issued Mar. 16, 1965.

It will be apparent that the relative proportions of the agents of the diffusion transfer processing composition may be altered to suit the requirements of the operator. Thus, it is within the scope of this invention to modify the herein described developing compositions by the substitution of preservatives, alkalies, etc., other than those specifically mentioned, provided that the pH of the composition is initially at the first pH and solvent concentration required. When desirable, it is also contemplated to include, in the developing composition, components such as restrainers, accelerators, etc. Similarly, the concentration of various components may be varied over a wide range and when desirable adaptable components may be disposed in the photosensitive element, prior to exposure, in a separate permeable layer of the photosensitive element and/or in the photosensitive emulsion.

In all examples of this specification, percentages of components are given by weight unless otherwise indicated.

An extensive compilation of specific dye developers particularly adapted for employment in photographic diffusion transfer processes is set forth in aforementioned U.S. Pat. No. 2,983,606 and in the various copending U.S. applications referred to in that patent, especially in the table of U.S. applications incorporated by reference into the patent as detailed in column 27. As examples of additional U.S. patents detailing specific dye developers for photographic transfer process use, mention may also be made of U.S. Pats. Nos. 2,983,605; 2,992,106; 3,047,386; 3,076,808; 3,076,820; 3,077,402; 3,126,280; 3,131,061; 3,134,762; 3,134,765; 3,135,604; 3,135,605; 3,135,606; 3,135,734; 3,141,772; 3,142,565; and the like.

As additional examples of synthetic, film-forming, permeable polymers particularly adapted to retain dispersed dye developer, mention may be made of nitrocarboxymethyl cellulose, as disclosed in U.S. Pat. No. 2,992,104; an acylamidobenzene sulfo ester of a partial sulfobenzal of polyvinyl alcohol, as disclosed in U.S. Pat. No. 3,043,692; polymers of N-alkyl-$\alpha,\beta$-unsaturated carboxamides and copolymers of N-alkyl-$\alpha,\beta$-carboxamides with N-hydroxyalkyl-$\alpha,\beta$-unsaturated carboxamides, as disclosed in U.S. Pat. No. 3,069,263; copolymers of vinylphthalimide and $\alpha,\beta$-unsaturated carboxylic acids, as disclosed in U.S. Pat. No. 3,061,428; copolymers of N-vinylpyrrolidones and $\alpha,\beta$-unsaturated carboxylic acids and terpolymers of N-vinylpyrrolidones, $\alpha,\beta$-unsaturated carboxylic acids and alkyl esters of $\alpha,\beta$-unsaturated carboxylic acids, as disclosed in U.S. Pat. No. 3,044,873; copolymers of N,N-dialkyl-$\alpha,\beta$-unsaturated carboxamides with $\alpha,\beta$-unsaturated carboxylic acids, the corresponding amides of such acids, and copolymers of N-aryl- and N-cycloalkyl-$\alpha,\beta$-unsaturated carboxamides with $\alpha,\beta$-unsaturated carboxylic acids, as disclosed in U.S. Pat. No. 3,069,296; and the like.

In addition to conventional techniques for the direct dispersion of a particulate solid material in a polymeric, or colloidal, matrix such as ball-milling and the like techniques, the preparation of the dye developer dispersion may also be obtained by dissolving the dye in an appropriate solvent, or mixture of solvents, and the resultant solution distributed in the polymeric binder, with optional subsequent removal of the solvent, or solvents, employed, as, for example, by vaporization where the selected solvent, or solvents, possesses a sufficiently low boiling point or washing where the selected solvent, or solvents, possesses a sufficiently high differential solubility in the wash medium, for example, water, when measured against the solubility of the remaining composition components, and/or obtained by dissolving both the polymeric binder and dye in a common solvent.

For further detailed treatment of solvent distribution systems of the types referred to above, and for an extensive compilation of the conventional solvents traditionally employed in the art to effect distribution of photographic color-providing materials in polymeric binders, specifically for the formation component layers of photographic film units, reference may be made to U.S. Pats. Nos. 2,269,158; 2,322,027; 2,304,939; 2,304,940; 2,801,171; and the like.

Although the invention has been discussed in detail throughout employing dye developers, the preferred dye image-providing materials, it will be readily recognized that other, less preferred, dye image-providing materials may be substituted in replacement of the preferred dye developers in the practice of the invention. For example, there may be employed dye image-forming materials such as those disclosed in U.S. Pats. Nos. 2,647,049; 2,661,293; 2,698,244; 2,698,798; 2,802,735; 3,148,062; 3,227,550; 3,227,551; 3,227,552; 3,227,554; 3,243,294; 3,330,655; 3,347,671; 3,352,672; 3,364,022; 3,443,939; 3,443,940; 3,443,941; 3,443,943; etc., wherein color diffusion transfer processes are described which employ color coupling techniques comprising, at least in part, reacting one or more color developing agents and one or more color formers or couplers to provide a dye transfer image to a superposed image-receiving layer and those disclosed in U.S. Pats. Nos. 2,774,668 and 3,087,817, wherein color diffusion transfer processes are described which employ the imagewise differential transfer of complete dyes by the mechanisms therein described to provide a transfer dye image to a contiguous image-receiving layer, and thus including the employment of image-providing materials in whole or in part initially insoluble or nondiffusible as disposed in the film unit which diffuse during processing as a direct or indirect function of exposure.

For the production of the photosensitive gelatino silver halide emulsions employed to provide the film unit, the silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant water-soluble salts by chilling the dispersion, noodling the set dispersion, and washing the noodles with cold water, or alternatively, employing any of the various floc systems, or procedures, adapted to effect removal of undesired components, for example, the procedures described in U.S. Pats. Nos. 2,614,928; 2,614,929; 2,728,662; and the like; after-ripening the dispersion at an elevated temperature in combination with the addition of gelatin and various adjuncts, for example, chemical sensitizing agents of U.S. Pats. Nos. 1,574,944; 1,623,499; 2,410,689; 2,597,856; 2,597,915; 2,487,850; 2,518,698; 2,521,926; and the like; all according to the traditional procedures of the art, as described in Neblette, C. B., Photography Its Materials and Processes, 6th ed., 1962.

Optical sensitization of the emulsion's silver halide crystals may be accomplished by contact of the emulsion composition with an effective concentration of the selected optical sensitizing dyes dissolved in an appropriate dispersing solvent such as methanol, ethanol, acetone, water, and the like; all according to the traditional procedures of the art, as described in Hammer, F. M., The Cyanine Dyes and Related Compounds.

Additional optional additives, such as coating aids, hardeners, viscosity-increasing agents, stabilizers, preservatives, and the like, for example, those set forth hereinafter, also may be incorporated in the emulsion formulation, according to the conventional procedures known in the photographic emulsion manufacturing art.

The photoresponsive material of the photographic emulsion will, as previously described, preferably comprise a crystal of silver, for example, one or more of the silver halides such as silver chloride, silver iodide, silver bromide, or mixed silver halides such as silver chlorobromide or silver iodobromide, of varying halide ratios and varying silver concentrations.

The emulsions may include the various adjuncts, or addenda, according to the techniques disclosed in the art.

As the binder for the respective emulsion strata, the aforementioned gelatin may be, in whole or in part, replaced with some other colloidal material such as albumin; casein; or zein; or resins such as cellulose derivatives, as described in U.S. Pats. Nos. 2,322,085 and 2,327,808; polyacrylamides, as described in U.S. Pat. No. 2,541,474; vinyl polymers such as described in an extensive multiplicity of readily available U.S. and foregin patents.

Although the preceding description of the invention has been couched in terms of the preferred photosensitive component construction wherein at least two selectively sensitized photosensitive strata are in contiguous co-planar relationship and, specifically, in terms of the preferred tripack type structure comprising a red-sensitive silver halide emulsion stratum, a green-sensitive silver halide emulsion stratum and a blue-sensitive silver halide emulsion stratum having associated therewith, respectively a cyan dye developer, a magenta developer and a yellow dye developer, the photosensitive component of the film unit may comprise at least two sets of selectively sensitized minute photosensitive elements arranged in the form of a photosensitive screen wherein each of the minute photosensitive elements has associated therewith, for example, an appropriate dye developer in or behind its respecitve silver halide emulsion portion. In general, a suitable photosensitive screen will comprise minute red-sensitized emulsion elements, minute green-sensitized emulsion elements and minute blue-sensitized emulsion elements arranged in side-by-side relationship in a screen pattern and having associated therewith, respectively, a cyan, a magenta and a yellow dye developer.

The present invention also includes the employment of a black dye developer and the use of a mixture of dye developers adapted to provide a black-and-white transfer image, for example, the employment of dye developers of the three subtractive colors in an appropriate mixture in which the quantities of the dye developers are proportioned such that the colors combine to provide black.

Where in the specification, the expression "positive image" has been used, this expression should not be interpreted in a restrictive sense since it is used primarily for purposes of illustration, in that it defines the image produced on the image-carrying layer as being reversed, in the positive-negative sense, with respect to the image in the photosensitive emulsion layers. As an example of an alternative meaning for "positive image," assume that the photosensitive element is exposed to actinic light through a negative transparency. In this case, the latent image in the photosensitive emulsion layers will be a positive and the dye image produced on the image-carrying layer will be a negative. The expression "positive image" is intended to cover such an image produced on the image-carrying layer.

It will be recognized that, by reason of the preferred film unit's structural parameters, the transfer image formed upon directed exposure of the film unit to a selected subject and processing, will be a geometrically reversed image of the subject. Accordingly, to provide transfer image formation geometrically nonreversed, exposure of such film unit should be accomplished through an image reversing optical system such a camera possessing an image reversing optical system.

In addition to the described essential layers, it will be recognized that the film unit may also contain one or more subcoats or layers, which, in turn, may contain one or more additives such as plasticizers, intermediate essential layers for the purpose, for example, of improving adhesion, and that any one or more of the described layers may comprise a composite of two or more strata of the same, or different, components and which may be contiguous, or separated from, each other, for example, two or more neutralizing layers or the like, one of which may be disposed intermediate the cyan dye image-forming component retaining layer and the dimensionally stable opaque layer.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A photographic film unit which comprises photosensitive silver halide and a 9-pyridyl fluorene.

2. A photographic film unit as defined in claim 1 wherein said film unit comprises a support carrying a photosensitive silver halide layer having associated therewith a 9-(N-alkylpyridyl)-fluorene of the formula:

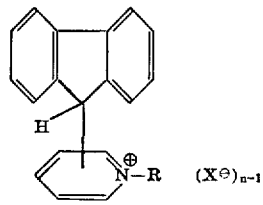

wherein R is an alkyl group; X is an anion; and n is the integer 1 when R is negatively charged and the integer 2 when R is electrically neutral.

3. A photographic film unit as defined in claim 2 wherein said silver halide emulsion has additionally associated therewith a photographic silver halide developing agent.

4. A photographic film unit as defined in claim 3 wherein said photographic silver halide developing agent is a dye.

5. A photographic film unit as defined in claim 2 which comprises a plurality of layers including a support layer carrying on one surface a photosensitive silver halide emulsion layer having associated therewith an image-forming material which is processing composition soluble and diffusible as a function of the point-to-point degree of silver halide emulsion exposure; a layer comprising a 9-[2-(N-alkyl)-pyridyl]-fluorene of the formula:

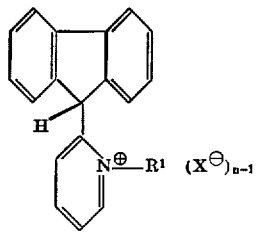

wherein $R^1$ is a lower alkyl group; X is an anion; and n is the integer 1 when R is negatively charged and the integer 2 when R is electrically neutral; and a layer adapted to receive solubilized image-forming material diffusing thereto.

6. A photographic film unit as defined in claim 5 which comprises a plurality of layers including an opaque support layer carrying on one surface, in order, a silver halide emulsion layer having associated therewith a dye image-forming material which is processing composition soluble and diffusible as a function of the point-to-point degree of exposure of said silver halide emulsion; a layer comprising 9-[2-(N-alkyl)-pyridyl]-fluorene of the formula:

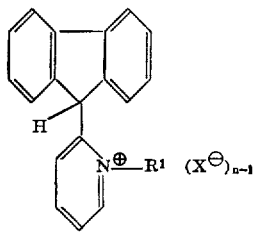

wherein $R^1$ is a lower alkyl group; X is an anion; and n is the integer 1 when R is negatively charged and the integer 2 when R is electrically neutral; reflecting means adapted to mask dye image-forming material associated with said silver halide emulsion layer subsequent to processing of the film unit; and a polymeric layer dyeable by said dye image-forming material.

7. A photographic film unit as defined in claim 5 which is adapted to be processed by passing said member between a pair of juxtaposed pressure-applying members and which comprises, in combination:

a photosensitive element including a composite structure containing, as essential layers, in sequence, a first dimensionally stable layer opaque to incident actinic radiation; a photosensitive silver halide emulsion layer having associated therewith a dye image-forming material which is processing composition soluble and diffusible as a function of exposure of the photosensitive silver halide emulsion layer to actinic radiation; a polymeric layer dyeable by said dye image-forming material; a second dimensionally stable layer transparent to incident actinic radiation; and means securing said layers in substantially fixed relationship;

a rupturable container retaining an alkaline processing composition containing reflecting agent fixedly positioned and extending transverse a leading edge of said photosensitive element to effect unidirectional discharge of said container's processing composition between said dyeable polymeric layer and the photosensitive silver halide emulsion layer next adjacent thereto upon application of compressive force to said container; and a 9-[2-(N-alkyl)-pyridyl]-fluorene optical filter agent of the formula:

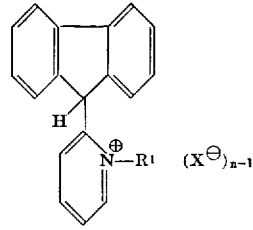

wherein $R^1$ is a lower alkyl group; X is an anion; and n is the integer 1 when R is negatively charged and the integer 2 when R is electrically neutral, disposed in at least one of said processing composition and, at a pH below its pKa, in a layer intermediate said photosensitive silver halide emulsion layer and said second dimensionally stable layer transparent to incident actinic radiation.

8. A photographic film unit as defined in claim 7 wherein said reflecting agent is titanium dioxide.

9. A photographic film unit as defined in claim 6 wherein said reflecting means, taken together with said 9-[2-(N-alkyl)-pyridyl]-fluorene are adapted to prevent further exposure of selectively photoexposed silver halide emulsion during processing in the presence of radiation actinic thereto and incident on the surface of said film unit opposite said opaque support layer.

10. A photographic film unit as defined in claim 7 including at least one acid reacting polymeric layer positioned intermediate at least one of said first dimensionally stable opaque layer and the photosensitive silver halide emulsion layer next adjacent thereto, and said second dimensionally stable transparent layer and the dyeable polymeric layer next adjacent thereto and said processing composition comprises an aqueous alkaline processing solution.

11. A photographic film unit as defined in claim 10 wherein said polymeric acid layer contains sufficient acidifying function to effect reduction of said processing composition from a first pH at which said dye image-forming material is substantially soluble and diffusible to a second pH at which said image-forming material is substantially nondiffusible.

12. A photographic film unit as defined in claim 11 wherein said dye image-forming material comprises a dye which is a silver halide developing agent.

13. A photographic film unit as defined in claim 12 wherein said photosensitive element includes at least two selectively sensitized silver halide emulsion layers each having a dye which dye is a silver halide developing agent of predetermined color associated therewith, each of said dyes are soluble and diffusible in alkaline processing composition as a function of the point-to-point degree of exposure of the respective emulsion associated therewith at said first pH and substantially nondiffusible in said alkaline processing composition at said second pH.

14. A photographic film unit as defined in claim 13 wherein each of said selectively sensitized photosensitive silver halide emulsion layers has predominant spectral sensitivity to separate regions of the spectrum and the dye associated with each of said silver halide emulsion layers possesses a spectral absorption range subsequent to processing substantially complementary to the predominant sensitivity range of its associated emulsion layer.

15. A photographic film unit as defined in claim 16 wherein each of said silver halide emulsion layers and its associated dye is separated from the next adjacent silver halide emulsion layer and its associated dye by an alkaline solution permeable polymeric interlayer.

16. A photographic film unit as defined in claim 15 wherein said photosensitive element includes, as essential layers, in sequence, from said dimensionally stable opaque layer, an alkaline solution permeable polymeric layer containing cyan dye; a red-sensitive silver halide emulsion layer; an alkaline solution permeable polymeric layer containing magenta dye; a green-sensitive silver halide emulsion layer; an alkaline solution permeable polymeric layer containing yellow dye; a blue-sensitive silver halide emulsion layer, each of said cyan, magenta and yellow dyes being silver halide developing agents and being soluble and diffusible, in aqueous alkaline solution at said first pH and substantially insoluble in aqueous alkaline solution at said second pH.

17. A photographic film unit as defined in claim 1 wherein said 9-pyridyl fluorene is

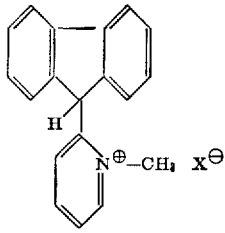

wherein X is an anion.

18. A photographic film unit as denfied in claim 1 wherein said 9-pyridyl fluorene is

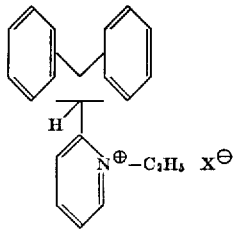

wherein X is an anion.

19. A process of forming photographic images which includes, in combination, the steps of exposing a photosensitive element comprising a plurality of layers including a support carrying on one surface a photosensitive silver halide layer to provide to said photosensitive layer a latent image as a function of the point-to-point degree of exposure of said photosensitive layer and contacting said photosensitive layer with an aqueous alkaline processing composition which comprises a silver halide developing agent, and a 9-pyridyl fluorene and possesses a pH above the pKa of said 9-pyridyl fluorene, for a time sufficient to develop said latent image to a visible image.

20. A process of forming photographic images as defined in claim 19 including the step of separating said processing composition from contact with said photosensitive element subsequent to substantial visible image formation.

21. A process of forming photographic images as defined in claim 19 wherein said 9-pyridyl fluorene is initially disposed at a pH below its pKa in an aqueous alkaline processing composition permeable layer of said element and said photosensitive layer is positioned intermediate said support and said layer comprising said 9-pyridyl fluorene.

22. A process of forming photographic images as defined in claim 21 including the step of reducing the pH of said photosensitive element subsequent to substantial visible image formation from the pH above the pKa of said 9-pyridyl fluorene induced by said aqueous alkaline processing composition to a pH below the pKa of said 9-pyridyl fluorene.

23. A process of forming photographic diffusion transfer images as defined in claim 20 which comprises, in combination, the steps of:
(a) exposing a photographic film unit which comprises a plurality of layers including an opaque dimensionally stable support layer carrying a photosensitive silver halide layer having associated therewith an image-providing material which is processing composition soluble and diffusible as a function of the point-to-point degree of exposure of said silver halide layer and a diffusion transfer process image-receiving layer adapted to receive solubilized image-forming material diffusing thereto;
(b) contacting said photosensitive silver halide emulsion with an aqueous alkaline processing composition which contains a 9-(N-alkylpyridyl)-fluorene of the formula:

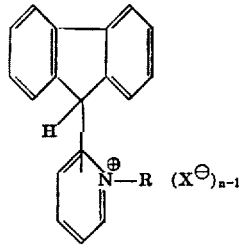

wherein R is an alkyl group; X is an anion; and $n$ is the integer 1 when R is negatively charged and the integer 2 when R is electrically neutral and a pH above the pKa of said 9-(N-alkylpyridyl)-fluorene;
(c) effecting thereby substantial development of said silver halide emulsion;
(d) forming thereby an imagewise distribution of mobile image-forming material, as a function of the point-to-point degree of emulsion exposure; and
(e) transferring by diffusion, at least a portion of said imagewise distribution of mobile image-forming material to said layer adapted to receive said material to provide thereto an image in terms of said imagewise distribution.

24. A process of forming transfer images as defined in claim 23 wherein said 9-(N-alkylpyridyl)-fluorene is disposed, at a pH below its pKa, in a separate processing composition permeable layer and said photosensitive silver halide layer is positioned intermediate said opaque support and said layer containing said 9-(N-alkylpyridyl)-fluorene.

25. A process of forming transfer images in color as defined in claim 23 which comprises, in combination, the steps of:
(a) exposing a photographic film unit which is adapted to be processed by passing said unit between a pair of juxtaposed pressure-applying members and which includes, in combination, a photosensitive element comprising a composite structure containing, as essential layers, in sequence, a first dimensionally stable layer opaque to incident actinic radiation; a photosensitive silver halide emulsion layer having associated therewith a dye image-forming material which is processing composition soluble and diffusible as a function of exposure of the photosensitive silver halide emulsion layer to actinic radiation; a polymeric layer dyeable by said dye image-forming material; a second dimensionally stable layer transparent to incident actinic radiation; and means securing said layers in substantially fixed relationship; means for interposing a reflecting agent and a 9-[2-(N-alkyl)-pyridyl]-fluorene of the formula:

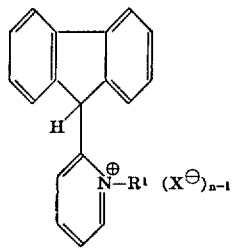

wherein $R^1$ is a lower alkyl group; X is an anion; and $n$ is the integer 1 wherein R is negatively charged and the integer 2 when R is electrically neutral, at a pH above its pKa intermediate said dyeable polymeric layer and said photosensitive silver halide emulsion layer and associated dye image-forming material subsequent to photoexposure of said film unit;
 a rupturable container retaining an aqueous alkaline processing composition possessing a pH above the pKa of said 9-[2-(N-alkyl)-pyridyl]-fluorene fixedly positioned and extending transverse a leading edge of said photosensitive element to effect unidirectional discharge of the container's processing composition intermediate said dyeable polymeric layer and the photosensitive silver halide emulsion layer next adjacent thereto upon application of compressive force to said container;
(b) applying compressive force to said rupturable container to effect unidirectional discharge of the container's processing composition intermediate said dyeable polymeric layer and said photosensitive silver halide emulsion layer;
(c) effecting thereby substantial development of said silver halide emulsion and disposition of said reflecting agent and said 9-[2-(N-alkyl)-pyridyl]-fluorene at a pH above its pKa intermediate said dyeable polymeric layer and said photosensitive silver halide emulsion layer;
(d) as a result of said development, forming an imagewise distribution of mobile dye image-forming material, as a function of the point-to-point degree of exposure of said emulsion;
(e) transferring, by diffusion, at least a portion of said imagewise distribution of mobile dye image-forming material to said dyeable polymeric layer to provide a dye image thereto in terms of said imagewise distribution; and
(f) maintaining said composite structure intact subsequent to said processing.

26. A process of forming transfer images in color as defined in claim 25 wherein said 9-[2-(N-alkyl)-pyridyl]-fluorene is initially disposed at a pH below its pKa in an aqueous alkaline processing composition permeable layer of said photosensitive element intermediate said dyeable polymeric layer and said silver halide emulsion layer and said rupturable container containing said aqueous alkaline processing composition possessing a pH above the pKa of said 9-[2-(N-alkyl)-pyridyl]-fluorene is fixedly positioned and extends transverse a leading edge of said photosensitive element to effect unidirectional discharge of the processing composition intermediate said dyeable polymeric layer and said layer containing said 9-[2-(N-alkyl)-pyridyl]-fluorene upon application of compressive force to said container and including the step of discharging said processing composition, subsequent to exposure of said photosensitive element, intermediate said dyeable polymeric layer and said layer containing said 9-[2-(N-alkyl)-pyridyl]-fluorene.

27. A process of forming transfer images in color as defined in claim 26 wherein said reflecting agent is titanium dioxide and said 9-[2-(N-alkyl)-pyridyl]-fluorene and said titanium dioxide are initially disposed in said aqueous alkaline processing composition as retained in said rupturable container.

28. A process of forming transfer images in color as defined in claim 25 wherein said photosensitive element includes at least one acid reacting polymeric layer positioned intermediate at least one of said first dimensionally stable opaque layer and the photosensitive silver halide emulsion layer next adjacent thereto, and said second dimensionally stable transparent layer and the dyeable polymeric layer next adjacent thereto and contains sufficient acidifying function to effect reduction of said aqueous alkaline processing composition from a pH above to a pH below the pKa of said 9-[2-(N-alkyl)-pyridyl]-fluorene and including the step of transferring, by diffusion, subsequent to substantial transfer dye image formation, a sufficient portion of the ions of said processing composition to said polymeric acid layer to thereby reduce from said pH above to said pH below said pKa.

29. A process of forming transfer images in color as defined in claim 28 wherein said polymeric acid layer contains sufficient acidifying function to effect reduction of said processing composition from a first pH at which said dye image-forming material is substantially soluble and diffusible to a second pH at which said image-forming material is substantially nondiffusible and including the step of transferring, by diffusion, subsequent to substantial transfer dye image formation, a sufficient portion of the ions of said processing composition to said polymeric acid layer to thereby reduce the alkalinity of said solution from said first pH to said second pH.

30. A process of forming transfer images in color as defined in claim 29 wherein said dye image-forming material comprises a dye which is a silver halide developing agent.

31. A process of forming transfer images in color as defined in claim 30 which comprises, in combination, the steps of:
(a) exposing a photographic film unit which is adapted to be processed by passing said unit between a pair of juxtaposed pressure-applying members and which includes, in combination, a photosensitive element comprising a composite structure containing a first dimensionaly stable, liquid impermeable layer opaque to incident actinic radiation; at least two selectively sensitized silver halide emulsion layers, each of said silver halide emulsions having associated therewith a dye, which is a silver halide developing agent, of predetermined color, and is soluble and diffusible, in aqueous alkaline processing composition as a function of the point-to-point degree of exposure of the respective emulsion associated therewith; a polymeric layer dyeable by said dyes; a second dimensionally stable, liquid impermeable layer transparent to incident actinic radiation; and means securing said layers in substantially fixed relationship; and a rupturable container retaining aqueous alkaline processing composition containing a reflecting agent in a quantity sufficient to mask said dyes and a 9-[2-(N-alkyl)-pyridyl]-fluorene optical filter agent of the formula:

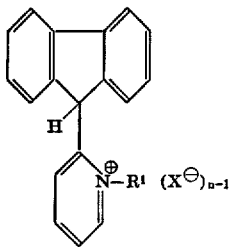

wherein $R^1$ is a lower alkyl group; X is an anion; and $n$ is the integer 1 when R is negatively charged and the integer 2 when R is electrically neutral, and possessing a pH above the pKa of said optical filter element fixedly positioned and extending transverse a leading edge of said photosensitive element to effect unidirectional discharge of the container's processing composition between said dyeable polymeric layer and the photosensitive silver halide emulsion layer next adjacent thereto upon application of compressive force to said container;

(b) applying compressive force to said rupturable container to effect discharge of the container's aqueous alkaline processing composition between said dyeable polymeric layer and the photosensitive silver halide emulsion layer next adjacent thereto;

(c) effecting thereby substantial development of each of said silver halide emulsions;

(d) as a result of said development, immobilizing the dye associated with each of said silver halide emulsions, as a function of the point-to-point degree of exposure of said associated emulsion;

(e) forming thereby an imagewise distribution of mobile dye as a function of emulsion exposure;

(f) transferring, by diffusion, at least a portion of each of said imagewise distributions of mobile dye to said polymeric layer dyeable by said dye to provide thereto a dye image in terms of said imagewise distribution; and (g) maintaining said composite structure intact subsequent to said processing.

32. A process of forming transfer images in color as defined in claim 31 wherein each of said selectively sensitized silver halide emulsion layers possesses predominant spectral sensitivity to separate regions of the spectrum and the dye associated with each of said emulsion layers possesses a spectral absorption range subsequent to processing substantially complementary to the predominant sensitivity range of its associated emulsion.

33. A process of forming transfer images in color as defined in claim 32 wherein said composite structure includes at least one polymeric acid layer positioned intermediate at least one of said first dimensionally stable layer and the next adjacent photosensitive silver halide layer, and said second dimensionally stable layer and the next adjacent dyeable polymeric layer and said polymeric acid layer contains sufficient acidifying groups to effect reduction of said aqueous alkaline processing composition from a first pH above the pKa of said optical filter agent at which said dyes are substantially soluble and diffusible to a second pH below the pKa of said optical filter agent at which said dyes are substantially nondiffusible and including the steps of transferring, by diffusion, subsequent to substantial transfer image formation, a sufficient portion of the ions of said alkaline processing composition to said polymeric acid layer to thereby reduce the alkalinity of said composition from said first pH to said second pH.

34. A process of forming transfer images in color as defined in claim 33 which comprises, in combination, the steps of:

(a) exposing a photographic film unit which is adapted to be processed by passing said unit between a pair of juxtaposed pressure-applying members and which includes, in combination, a photosensitive element comprising a composite structure containing, as essential layers, in sequence, a first dimensionally stable alkaline solution impermeable layer opaque to incident actinic radiation; a red-sensitive silver halide emulsion layer having associated therewith cyan dye; a green-sensitive silver halide emulsion layer having associated therewith magenta dye; a blue-sensitive silver halide emulsion layer having associated therewith a yellow dye; each of said cyan, magenta and yellow dyes being silver halide developing agents and soluble and diffusible in an aqueous alkaline solution at a first pH; an alkaline solution permeable transparent polymeric layer dyeable by said dyes; an alkaline solution permeable transparent polymeric acid layer containing sufficient acidifying groups to effect reduction of an alkaline processing solution having said first pH to a second pH at which said dyes are substantially nondiffusible; a second dimensionally stable alkaline solution impermeable layer transparent to incident actinic radiation; and a rupturable container retaining an aqueous alkaline processing solution containing a reflecting agent in a quantity sufficient to mask said dyes and a 9-[2-(N-alkyl)-pyridyl]-fluorene optical filter agent of the formula:

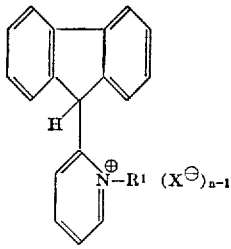

wherein $R^1$ is a lower alkyl group; X is an anion; and $n$ is the integer 1 when R is negatively charged and the integer 2 when R is electrically neutral, and possessing a first pH above the pKa of said optical filter agent at which said dyes are soluble and diffusible, fixedly position and extending transverse a leading edge of said photosensitive element to effect undirectional discharge of said container's processing solution between said dyeable polymeric layer and said blue-sensitive silver halide emulsion layer upon application of compressive force to said container;

(b) applying compressive force to said rupturable container to effect unidirectional discharge of the container's processing composition intermediate said dyeable polymeric layer and said blue-sensitive silver halide emulsion layer next adjacent thereto;

(c) effecting thereby substantial development of the latent image contained in each of said red-, green- and blue-sensitive silver halide emulsions;

(d) immobilizing said yellow, magenta and cyan dyes as a result of development of their respective silver halide emulsions;

(e) forming thereby an imagewise distribution of mobile yellow, magenta and cyan dye as a function of the point-to-point degree of exposure of their respective silver halide emulsions;

(f) transferring, by diffusion, at least a portion of each of the imagewise distributions of mobile dye to said alkaline solution permeable polymeric layer dyeable by said dyes to provide thereto a multicolor dye image;

(g) transferring, by diffusion, subsequent to substantial transfer image formation, a sufficient portion of the ions of said aqueous alkaline processing solution to said alkaline solution permeable polymeric acid layer to thereby reduce the alkalinity of said solution from said first pH above the pKa of said optical filter agent at which said dyes are soluble and diffusible to a second pH below the pKa of said optical filter agent and at which said dyes are substantially nondiffusible; and (h) maintaining said composite structure intact subsequent to said processing.

35. A process of forming transfer images in color as defined in claim 22 wherein said optical filter agent is

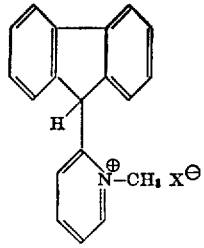

wherein X is an anion.

36. A process of forming transfer images in color as defined in claim 22 wherein said optical filter agent is

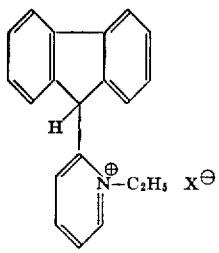

wherein X is an anion.

References Cited
UNITED STATES PATENTS

| | | | |
|---|---|---|---|
| 3,498,789 | 3/1970 | Sutherns et al. | 96—84 |
| 3,460,942 | 8/1969 | Rogers | 96—29 |

J. TRAVIS BROWN, Primary Examiner

A. T. SURO PICO, Assistant Examiner

U.S. Cl. X.R.

96—29 D, 76 C, 77, 84 R; 252—300; 260—290 R